US009485758B2

(12) United States Patent
Kim et al.

(10) Patent No.: US 9,485,758 B2
(45) Date of Patent: Nov. 1, 2016

(54) METHOD AND APPARATUS FOR UPLINK TRANSMISSION

(71) Applicant: LG ELECTRONICS INC., Seoul (KR)

(72) Inventors: Bonghoe Kim, Anyang-si (KR); Yunjung Yi, Anyang-si (KR); Suckchel Yang, Anyang-si (KR); Hanbyul Seo, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 14/378,301

(22) PCT Filed: Mar. 18, 2013

(86) PCT No.: PCT/KR2013/002193
§ 371 (c)(1),
(2) Date: Aug. 12, 2014

(87) PCT Pub. No.: WO2013/137699
PCT Pub. Date: Sep. 19, 2013

(65) Prior Publication Data
US 2015/0016377 A1 Jan. 15, 2015

Related U.S. Application Data

(60) Provisional application No. 61/612,205, filed on Mar. 16, 2012.

(51) Int. Cl.
*H04W 4/00* (2009.01)
*H04W 72/04* (2009.01)
(Continued)

(52) U.S. Cl.
CPC ....... *H04W 72/0413* (2013.01); *H04B 7/2615* (2013.01); *H04L 5/001* (2013.01); *H04L 5/0048* (2013.01); *H04L 5/0053* (2013.01); *H04L 27/2602* (2013.01); *H04W 4/005* (2013.01)

(58) Field of Classification Search
CPC . H04L 27/2602; H04L 5/0048; H04L 5/001; H04L 5/0053; H04W 72/0413; H04W 4/005; H04B 7/2615
USPC .......................... 370/329; 455/450, 464, 509
See application file for complete search history.

(56) References Cited

U.S. PATENT DOCUMENTS

2011/0170515 A1    7/2011  Kim
2013/0058317 A1*  3/2013  Park ..................... H04L 5/0092
                                                                370/336
(Continued)

FOREIGN PATENT DOCUMENTS

WO    2011/136524    11/2011
WO    2011/162565    12/2011
(Continued)

OTHER PUBLICATIONS

PCT International Application No. PCT/KR2013/002193, Written Opinion of the International Searching Authority dated Jun. 26, 2013, 1 page.

*Primary Examiner* — Mang Yeung
(74) *Attorney, Agent, or Firm* — Lee, Hong, Degerman, Kang & Walmey

(57) ABSTRACT

Disclosed are a method and an apparatus for uplink transmission. A method for uplink transmission for a machine-type communication (MTC) terminal comprises: a step of transmitting first uplink (UL) information via a first UL channel in a first terminal-specific frequency band of a first subframe; and a step of transmitting second UL information via a second UL channel in a second terminal-specific frequency band of a second subframe subsequent to the first subframe. The first subframe and the second subframe each include a plurality of orthogonal frequency division multiplexing (OFDM) symbols. If the first terminal-specific frequency band and the second terminal-specific frequency band do not overlap one another, the second UL information may not be transmitted in a first OFDM symbol of the second subframe. Thus, a wireless resource can be efficiently utilized.

7 Claims, 20 Drawing Sheets

(51) Int. Cl.
*H04B 7/26* (2006.01)
*H04L 5/00* (2006.01)
*H04L 27/26* (2006.01)

(56) References Cited

U.S. PATENT DOCUMENTS

2013/0114570 A1* 5/2013 Park ................. H04L 5/0053
  370/335
2013/0286918 A1* 10/2013 Park ....................... A01N 37/02
  370/311
2014/0133430 A1* 5/2014 Yang ..................... H04L 1/1854
  370/329
2014/0146738 A1* 5/2014 Morioka ............... H04L 1/1861
  370/312

FOREIGN PATENT DOCUMENTS

| WO | 2012/005494 | 1/2012 |
| WO | 2012/023819 | 2/2012 |

* cited by examiner (A)

(B)

(A)

(B)

(A)

(B)

(A)

(B)

METHOD AND APPARATUS FOR UPLINK TRANSMISSION

CROSS-REFERENCE TO RELATED APPLICATIONS

This application is the National Stage filing under 35 U.S.C. 371 of International Application No. PCT/KR2013/002193, filed on Mar. 18, 2013, which claims the benefit of U.S. Provisional Application Ser. No. 61/612,205, filed on Mar. 16, 2012, the contents of which are all hereby incorporated by reference herein in their entirety.

BACKGROUND OF THE INVENTION

1. Field of the Invention

The present invention concerns wireless communications, and more specifically, to an uplink transmission method.

2. Related Art

M2M (machine to machine)/IoT (Internet of Things) recently gains attention, as a main issue, in the next-generation communication market for connecting all the ambient things to each other via a network to provide for easy acquisition and delivery of necessary information anytime and anywhere and to resultantly provide for various services. The initial type of M2M primarily focused on sensors and RFID (Radio Frequency Identification) networks targeting local areas. However, more attention is nowadays oriented towards the mobile communication network-based M2M considering mobility of things, a wide service range including islands or mountainous areas or marine areas, easy operation or maintenance of networks, security for high-reliability data transmission, and guarantee of service quality.

The 3GPP, a representative European mobile communication standardization organization, since having studied feasibility on M2M on 2005, started standardization under the title "Machine Type Communications (MTC)" from 2008.

In view of the 3GPP, the term "machine" refers to an entity that does not require direct manipulation or involvement of human beings, and the term "MTC" is defined as a type of data communication including one or more of such type of machines.

As a typical example of the machine, a smart meter or vending machine equipped with a mobile communication module is referenced. As the smartphone appears that may automatically gain access to a network to conduct communication even without the user's manipulation or involvement depending on the user's position or condition, the portable terminals with the MTC function are also taken into account as a type of the machine. Further, a gateway-type MTC device connected with IEEE 802.15 WPAN (Wireless Personal Area Network)-based microsensors or RFIDs are also being considered as an MTC device.

To encompass a great number of MTC devices communicating a small amount of data, the mobile communication network requires an identifier and address system different from the conventional ones and may need a new mechanism considering communication schemes and costs.

SUMMARY OF THE INVENTION

An object of the present invention is to provide an uplink transmission method.

Another object of the present invention is to provide a device that performs an uplink transmission method.

To achieve the above objects of the present invention, according to an aspect of the present invention, an uplink transmission method for an MTC (Machine Type Communication) terminal may comprise transmitting first UL (uplink) information on a first UL channel in a first terminal-specific frequency band of a first OFDM (Orthogonal Frequency Division Multiplexing) symbol; and transmitting second UL information on a second UL channel in a second terminal-specific frequency band of a second OFDM symbol, wherein at least one OFDM symbol may be arranged between the first OFDM symbol and the second OFDM symbol, and wherein when the first terminal-specific frequency band may not be consistent with the second terminal-specific frequency band or when the first terminal-specific frequency band does not include the second terminal-specific frequency band, UL transmission may not be performed in the at least one OFDM symbol between the first OFDM symbol and the second OFDM symbol. The first OFDM symbol may be a last OFDM symbol of a first subframe, and the second OFDM symbol may be a second OFDM symbol of a second subframe contiguous to the first subframe, wherein a bandwidth supported by the MTC terminal may be smaller than an overall bandwidth of the first subframe and the second subframe, wherein the size of the first terminal-specific frequency band and the second terminal-specific frequency band may be equal to or smaller than the bandwidth supported by the MTC terminal, and wherein the overall bandwidth may be 20 MHz or more, and the bandwidth supported by the MTC terminal may be 0.5 MH or more and 2 MHz or less. The first OFDM symbol may be a last OFDM symbol of a first subframe, and the second OFDM symbol may be a second OFDM symbol of a second subframe contiguous to the first subframe, and the method further may comprise transmitting an SRS (Sounding Reference Signal) in a third terminal-specific frequency band of one OFDM symbol among a plurality of OFDM symbols in the first subframe. The UL transmission may not be performed in an OFDM symbol subsequent to the OFDM symbol where the SRS may be transmitted. The first UL channel may include at least one of a first PUCCH (physical uplink control channel) and a first PUSCH (physical uplink shared channel), and the second UL channel may include at least one of a second PUCCH and a second PUSCH. The uplink transmission method may further comprise receiving terminal-specific frequency band determination information from a base station, wherein the terminal-specific frequency band determination information may include information on the first terminal-specific frequency band and the second terminal-specific frequency band. The terminal-specific frequency band determination information may include information on a frequency pattern in which a frequency band changes from the first terminal-specific frequency band to the second terminal-specific frequency band.

To achieve the above objects of the present invention, according to an aspect of the present invention, an MTC (Machine Type Communication) terminal, the MTC terminal comprising a processor, the processor configured to transmit first UL (uplink) information on a first UL channel in a first terminal-specific frequency band of a first OFDM (Orthogonal Frequency Division Multiplexing) symbol; and transmit second UL information on a second UL channel in a second terminal-specific frequency band of a second OFDM symbol, wherein at least one OFDM symbol may be arranged between the first OFDM symbol and the second OFDM symbol, and wherein when the first terminal-specific frequency band may not be consistent with the second terminal-specific frequency band or when the first terminal-specific frequency band does not include the second terminal-specific frequency band, UL transmission may not be performed in the at least one OFDM symbol between the first OFDM symbol and the second OFDM symbol. The first OFDM symbol may be a last OFDM symbol of a first subframe, and the second OFDM symbol may be a second OFDM symbol of a second subframe contiguous to the first subframe, wherein a bandwidth supported by the MTC terminal may be smaller than an overall bandwidth of the first subframe and the second subframe, wherein the size of the first terminal-specific frequency band and the second terminal-specific frequency band may be equal to or smaller than the bandwidth supported by the MTC terminal, and wherein the overall bandwidth may be 20 MHz or more, and the bandwidth supported by the MTC terminal may be 0.5 MH or more and 2 MHz or less. The processor may be configured to transmit an SRS (Sounding Reference Signal) in a third terminal-specific frequency band of one OFDM symbol among a plurality of OFDM symbols in the first subframe, and wherein the first OFDM symbol may be a last OFDM symbol of a first subframe, and the second OFDM symbol may be a second OFDM symbol of a second subframe contiguous to the first subframe. The processor may be configured to prevent the UL transmission from being performed in an OFDM symbol subsequent to the OFDM symbol where the SRS may be transmitted. The first UL channel may include at least one of a first PUCCH (physical uplink control channel) and a first PUSCH (physical uplink shared channel), and the second UL channel may include at least one of a second PUCCH and a second PUSCH. The processor may be configured to receive terminal-specific frequency band determination information from a base station, wherein the terminal-specific frequency band determination information may include information on the first terminal-specific frequency band and the second terminal-specific frequency band. The terminal-specific frequency band determination information may include information on a frequency pattern in which a frequency band changes from the first terminal-specific frequency band to the second terminal-specific frequency band.

Radio resources may be efficiently utilized.

DESCRIPTION OF EXEMPLARY EMBODIMENTS

The wireless device may be stationary or mobile and may also be referred to as UE (User Equipment), MS (mobile station), MT (mobile terminal), UT (user terminal), SS (subscriber station), PDA (personal digital assistant), wireless modem, handheld device, etc. The wireless device may be a device that supports only data communication such as MTC (Machine-Type Communication) devices.

The base station (BS) refers to a fixed station that typically communicates with a wireless device and may be referred to as eNB (evolved-NodeB), BTS (Base Transceiver System), access point, etc.

Hereinafter, application of the present invention based on 3GPP ($3^{rd}$ Generation Partnership Project) TS (Technical Specification) release 8-based 3GPP LTE (Long Term Evolution) or 3GPP TS release 10-based 3GPP LTE-A is described. This is merely an example, and the present invention may be applicable to various wireless communication networks. Hereinafter, LTE includes LTE and/or LTE-A.

Figure 1:
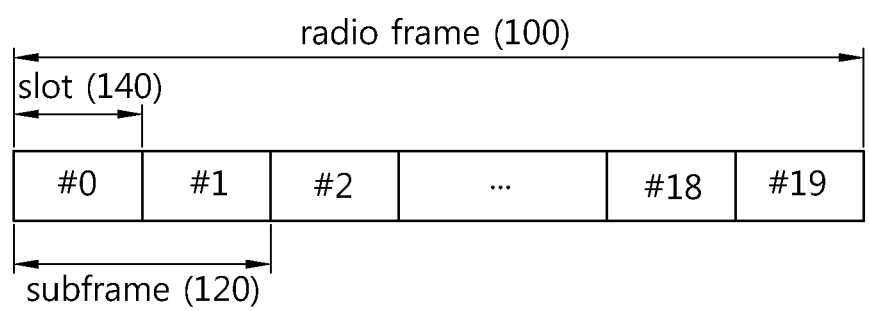
FIG. 1 shows the structure of a radio frame in 3GPP ($3^{rd}$ Generation Partnership Project) LTE (Long Term Evolution).

FIG. 1 shows the structure of a radio frame in 3GPP ($3^{rd}$ Generation Partnership Project) LTE (Long Term Evolution).

For the structure of the radio frame 100 in 3GPP LTE, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)," Ch. 5 may be referenced. Referring to FIG. 1, the radio frame 100 includes 10 subframes 120, and one subframe 120 includes two slots 140. The radio frame 100 may be indexed along the slots 140 from slot #0 to slot #19 or may be indexed along the subframes 120 from subframe #0 to subframe #9. Subframe #0 may include slot #0 and slot #1.

The time taken for one subframe 120 to be transmitted is denoted TTI (Transmission Time Interval). The TTI may be a scheduling unit for data transmission. For example, the length of one radio frame 100 may be 10 ms, the length of one subframe 120 may be 1 ms, and the length of one slot 140 may be 0.5 ms.

One slot 140 includes a plurality of OFDM (Orthogonal Frequency Division Multiplexing) symbols in the time domain and a plurality of sub-carriers in the frequency domain. The OFDM symbol is for representing one symbol period in view that 3GPP LTE adopts OFDMA for downlink and may be denoted with other terms according to multiple access schemes. For example, in case SC-FDMA (Single Carrier-Frequency Division Multiple Access) as uplink multiple access scheme, the symbol may be denoted SC-FDMA symbol. A resource block (RB) is the unit for resource allocation, and includes a plurality of contiguous sub-carriers in one slot. The resource block will be described below in detail in connection with FIG. 2. The structure of the radio frame 100 shown in FIG. 1 is merely an example. Accordingly, the number of subframes 120 included in the radio frame 100, the number of slots 140 included in the subframe 120, or the number of OFDM symbols included in the slot 140 may vary widely, so that new formats of the radio frame may be defined.

According to the 3GPP LTE standards, in case normal cyclic prefix (CP) is used, one slot includes seven OFDM symbols, and in case extended CP is used, one slot includes six OFDM symbols.

Wireless communication systems may be generally classified into ones using the FDD (Frequency Division Duplex) scheme and ones using the TDD (Time Division Duplex) scheme. According to the FDD scheme, uplink transmission and downlink transmission, respectively, are performed in different frequency bands from each other. According to the TDD scheme, uplink transmission and downlink transmission are performed in different times, respectively, while occupying the same frequency band. The TDD scheme-based channel responses are conducted substantially reciprocally. This means that in a given frequency band a downlink channel response is substantially the same as an uplink channel response. Accordingly, the TDD-based wireless communication system has the benefit that a downlink channel response may be obtained from an uplink channel response. Since in the TDD scheme the overall frequency band is time-divided for uplink transmission and downlink transmission, the downlink transmission by the base station cannot be performed simultaneously with the uplink transmission by the terminal. In the TDD system where uplink transmission is distinguished from downlink transmission per subframe, the uplink transmission and the downlink transmission are conducted in different subframes from each other.

Figure 2:
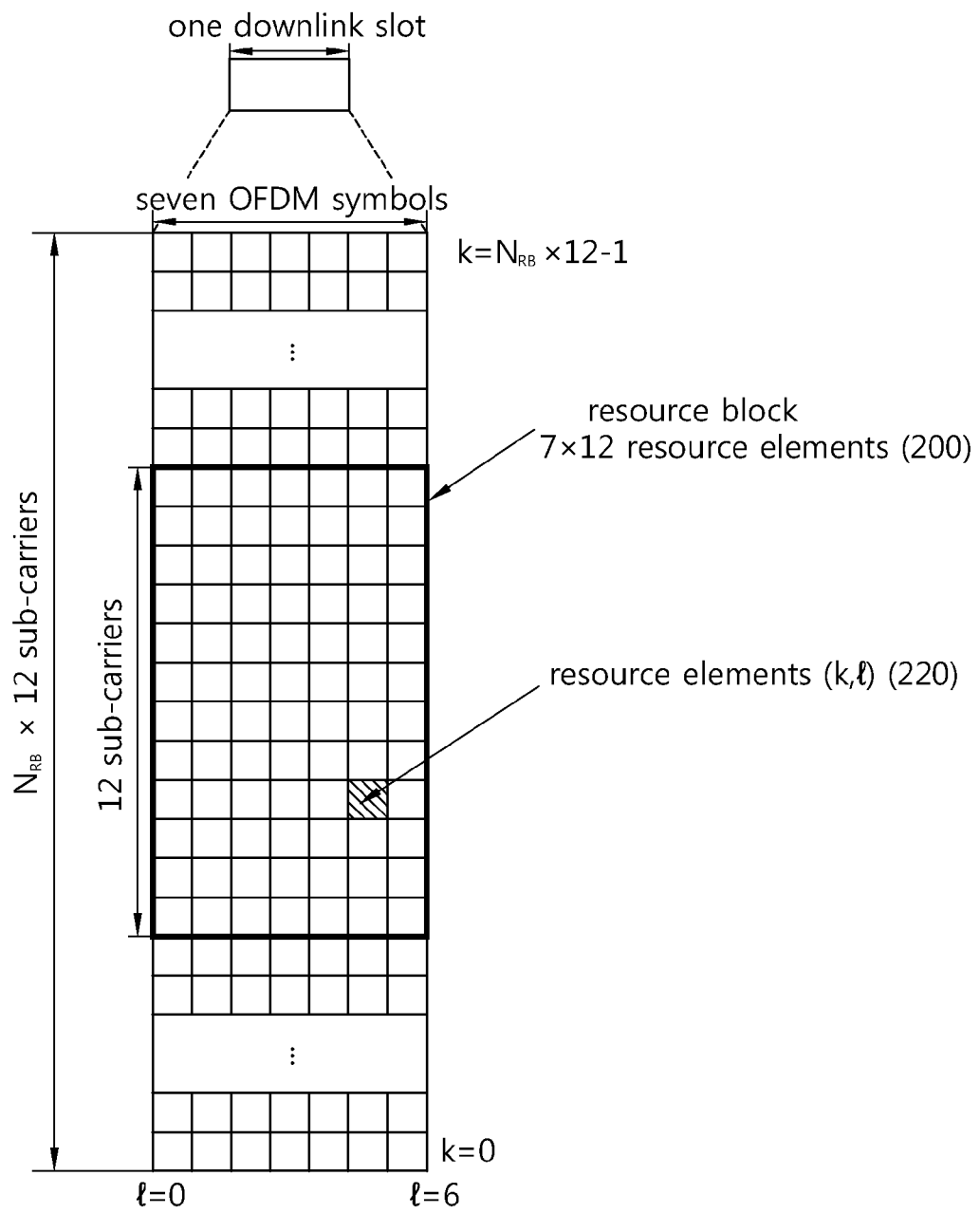
FIG. 2 shows an example resource grid for a downlink slot.

FIG. 2 shows an example resource grid for a downlink slot.

The downlink slot includes a plurality of OFDM symbols in the time domain and includes $N_{RB}$ resource blocks in the frequency domain. $N_{RB}$, the number of resource blocks included in the downlink slot, depends on the downlink transmission bandwidth set in the cell. For example, in the LTE system, $N_{RB}$ may be any one between 6 and 110 depending on the transmission bandwidth used. One resource block 200 includes a plurality of sub-carriers in the frequency domain. The structure of the uplink slot may be the same as the structure of the downlink slot.

Each element in the resource grid is referred to as resource element 220. The resource element 220 in the resource grid may be identified by an index pair k and l in the slot. Here, k (k=0, . . . , $N_{RB}$×12−1) is a sub-carrier index in the frequency domain, and l (l=0, . . . , 6) is an OFDM symbol index in the time domain.

Although the example in which one resource block 200 includes 7×12 resource elements 220 having seven OFDM symbols in the time domain and twelve sub-carriers in the frequency domain is described, the number of OFDM symbols and sub-carriers in the resource block 200 are not limited thereto. The number of OFDM symbols and the number of sub-carriers may vary widely depending on the length of CP or frequency spacing. For example, in the case of normal CP, the number of OFDM symbols is seven, and in the case of extended CP, the number of OFDM symbols is six. The number of sub-carriers in one OFDM symbol may be one of 128, 256, 512, 1024, 1536 and 2048.

Figure 3:
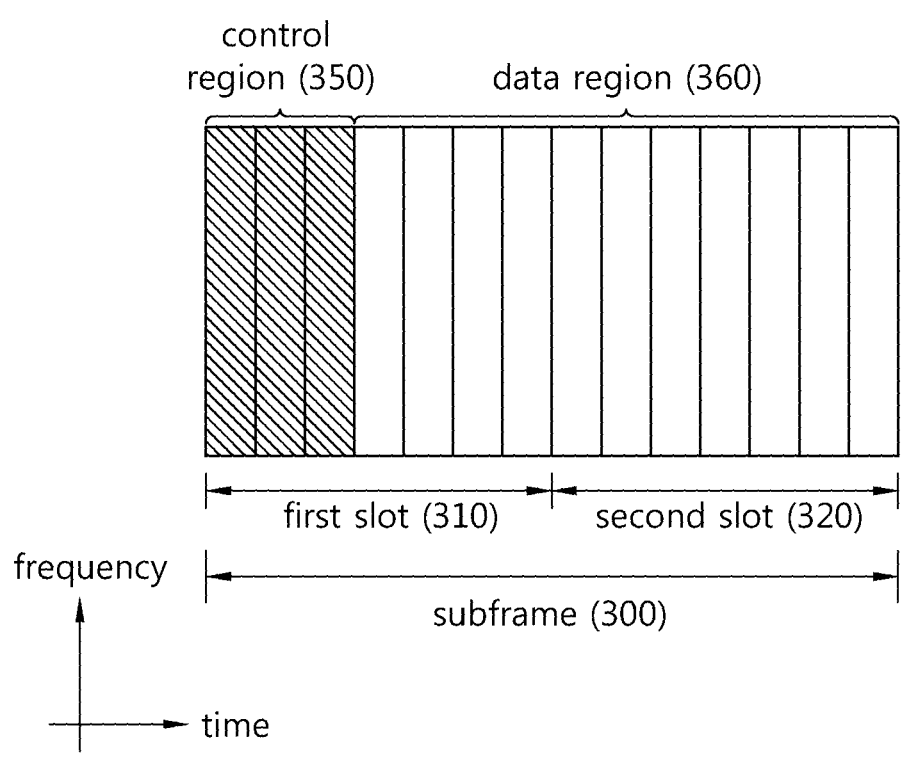
FIG. 3 shows the structure of a downlink subframe.

FIG. 3 shows the structure of a downlink subframe.

The downlink subframe 400 includes two slots 310 and 320 in the time domain, and each slot 310 or 320 includes seven OFDM symbols in the normal CP. The first up to three OFDM symbols (up to 4 OFDM symbols for the 1.4 Mhz bandwidth) in the first slot 310 of the subframe 300 become a control region 350 where control channels are assigned, and the remaining OFDM symbols become a data region 360 where a PDSCH (Physical Downlink Shared Channel) is assigned.

The PDCCH may carry resource allocation of DL-SCH (downlink-shared channel) and transmission format, resource allocation information of UL-SCH, paging information on PCH, system information on DL-SCH, resource allocation of upper layer control message such as random access response transmitted on PDSCH, a set of transmission power control commands on individual UEs in any UE group, and activation information of VoIP (Voice over internet Protocol). A plurality of PDCCH regions may be defined in the control region 350, and the terminal may monitor a plurality of PDCCHs. A PDCCH is transmitted on one or the aggregation of a few contiguous CCEs (Control Channel Elements). The CCE is the logical allocation unit used to provide the PDCCH with a coding rate depending on the condition of a radio channel. The CCE corresponds to a plurality of resource element groups. Depending on the correlation between the number of CCEs and coding rate provided by the CCEs, the format of PDCCH and the possible number of PDCCH bits are determined.

The base station determine a PDCCH format depending on DCI (Downlink Control information) to be sent to the terminal and adds a CRC (Cyclic Redundancy Check) to the control information. The CRC is masked with a unique identifier (RNTI; radio network temporary identifier) depending on the owner or purpose of the PDCCH. In the case of a PDCCH for a particular terminal, the CRC might be masked with the terminal's unique identifier, e.g., C-RNTI (cell-RNTI). Or, in the case of a PDCCH for a paging message, the CRC might be masked with a paging indication identifier, e.g., P-RNTI (paging-RNTI). In the case of a PDCCH for a system information block (SIB), the CRC might be masked with a system information identifier, SI-RNTI (system information-RNTI). In order to indicate a random access response that is responsive to the terminal sending a random access preamble, an RA-RNTI (random access-RNTI) may be masked to the CRC.

Figure 4:
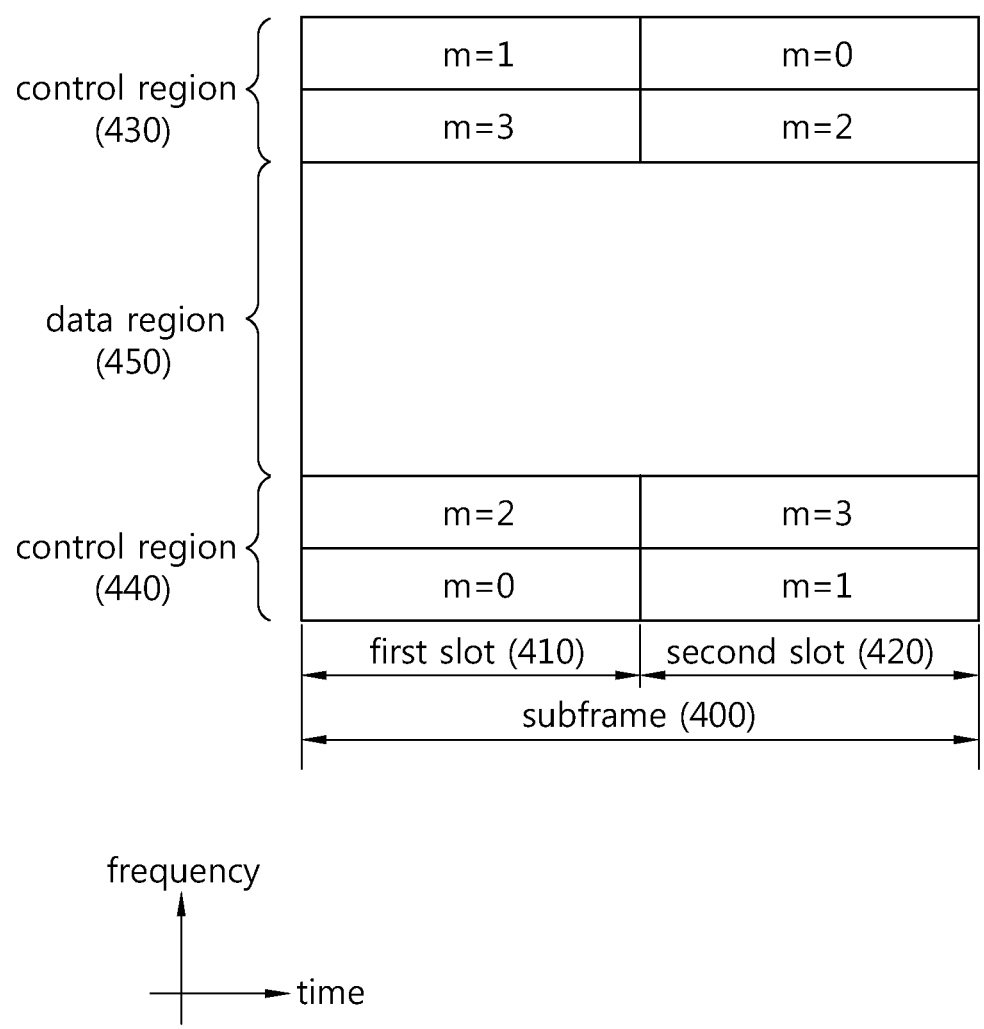
FIG. 4 shows the structure of an uplink subframe.

FIG. 4 shows the structure of an uplink subframe.

The uplink subframe may be divided into control regions 430 and 440 and a data region 450 in the frequency domain. The control regions 430 and 440 are assigned with a PUCCH (physical uplink control channel) for transmission of uplink control information. The data region 450 is assigned with a PUSCH (physical uplink shared channel) for transmission of data. When instructed by an upper layer, the terminal may support the simultaneous transmission of the PUSCH and the PUCCH.

A PUCCH for one terminal is assigned in a resource block (RB) pair in the subframe 400. The resource blocks in the resource block pair occupy different sub-carriers from each other in each of the first slot 410 and the second slot 420. The frequencies occupied by the resource blocks in the resource block pair assigned to the PUCCH change with respect to a slot boundary. This is referred to as the RB pair assigned to the PUCCH being frequency-hopped at the slot boundary. The terminal may obtain a frequency diversity gain by sending uplink control information through different sub-carriers from each other depending on times. m is a positional index indicating the logical frequency-domain position of the resource block pair assigned to the PUCCH in the subframe.

Uplink control information transmitted on PUCCH includes HARQ (hybrid automatic repeat request) ACK (acknowledgement)/NACK (non-acknowledgement), CQI (channel quality indicator) indicating the downlink channel state, and SR (scheduling request) that is a request for uplink radio resource allocation.

The PUSCH is mapped to the UL-SCH (uplink shared channel) that is a transport channel. Uplink data transmitted over PUSCH may be a transport block that is a data block for UL-SCH transmitted during a TTI. The transport block may be user information. Or, the uplink data may be multiplexed data. The multiplexed data may be the data obtained by multiplexing the transport block for UL-SCH and control information. For example, the control information multiplexed with data may include CQI, PMI (precoding matrix indicator), HARQ, and RI (rank indicator). Or, the uplink data may consist of control information only.

According to an embodiment of the present invention, a method for transmitting data through an uplink channel using only a portion of the frequency bandwidth of the uplink channel is described below.

Figure 5:
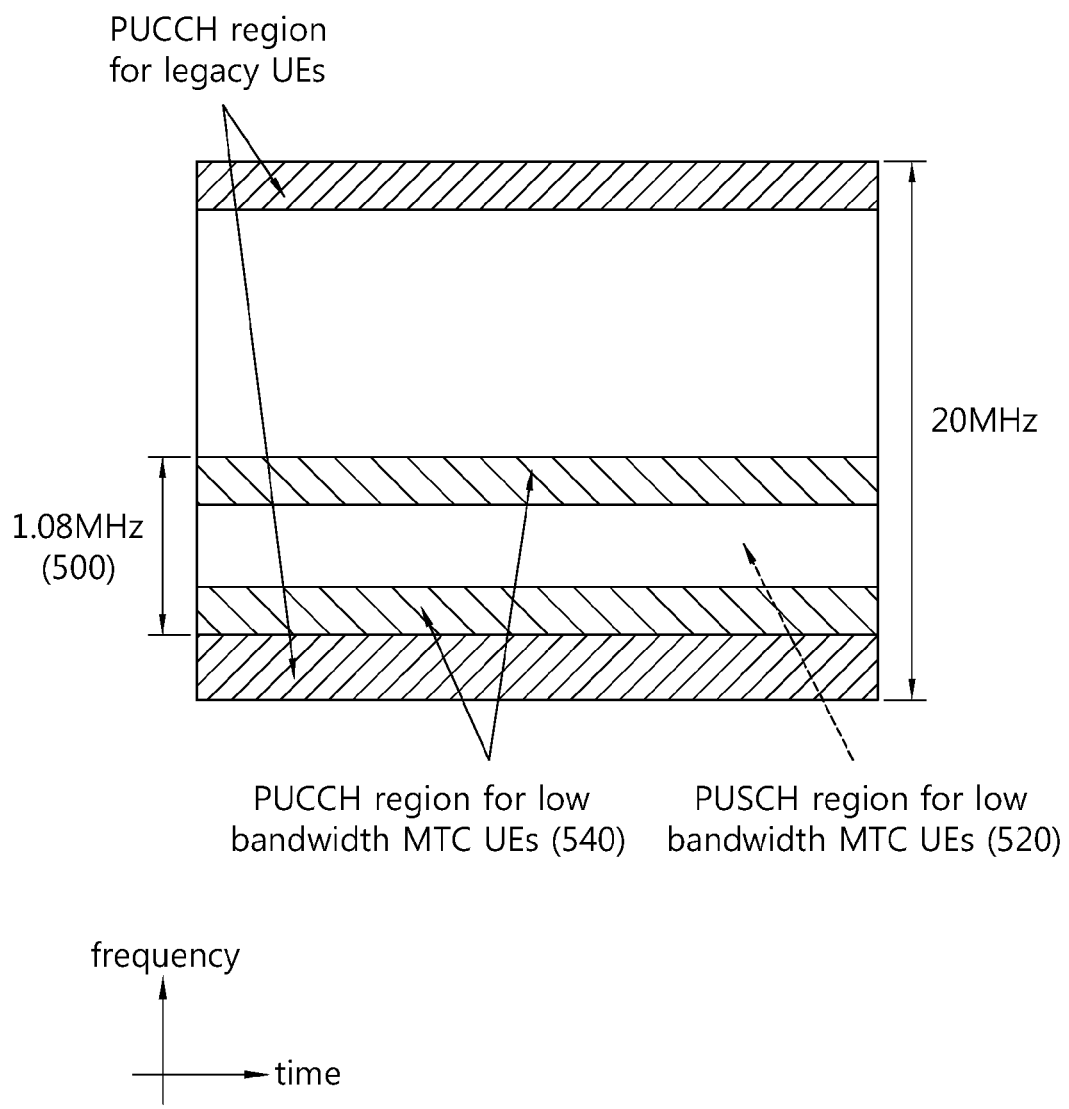
FIG. 5 is a concept view illustrating the transmission bandwidth of an uplink channel according to an embodiment of the present invention.

FIG. 5 is a concept view illustrating the transmission bandwidth of an uplink channel according to an embodiment of the present invention.

Referring to FIG. 5, the overall frequency bandwidth of the uplink channel is 20 MHz. The terminal may use a portion (e.g., 1.08 MHz) of the overall frequency band as its operation frequency band. The frequency band in which the terminal operates is defined as a terminal-specific frequency band 500. The terminal-specific frequency band 500, 1.08 MHz, is merely an example, and other various frequency bands may be used as the terminal-specific frequency band 500 (for example, 0.5 MHz-2 MHz). Further, the overall uplink bandwidth may include a plurality of terminal-specific frequency bands 500. The terminal may send data using only a portion of the terminal-specific frequency band 500.

Such terminal-specific frequency band 500 may be used as the uplink frequency bandwidth of a terminal periodically or aperiodically sending a small amount of data, such as MTC (machine type communication) UE (user equipment). The MTC terminal does not require a wide frequency bandwidth to transmit data through the uplink channel. Accordingly, the MTC terminal receives from the base station allocation information regarding the terminal-specific frequency band 500. The MTC terminal may send PUCCH (physical uplink control channel) data and PUSCH (physical uplink shared channel) data through the terminal-specific frequency band 500. The term "terminal" as used hereinafter may denote an MTC terminal.

The overall uplink frequency band may include a plurality of terminal-specific frequency bands 500 as subbands. The terminal may send PUCCH data and PUSCH data to the base station through one of the plurality of subbands. The phrase "the terminal-specific frequency band (or subband) used for the terminal to send data changes" denotes when the subband before change is not consistent with the subband after change or when the subband before change does not fully encompass the subband after change.

As used hereinafter, the "subband" may be used to have the same meaning as the terminal-specific frequency band 500. Some of the frequency resources in the terminal-specific frequency band 500 may be assigned as a terminal-specific PUCCH (520) resource for transmitting terminal-specific PUCCH data, and others may be assigned as a terminal-specific PUSCH 540 resource for transmitting terminal-specific PUSCH data.

A method for allocating a terminal-specific PUCCH 540, a terminal-specific PUSCH 520, and a reference signal in an uplink frequency bandwidth is described below according to an embodiment of the present invention.

Figure 6:
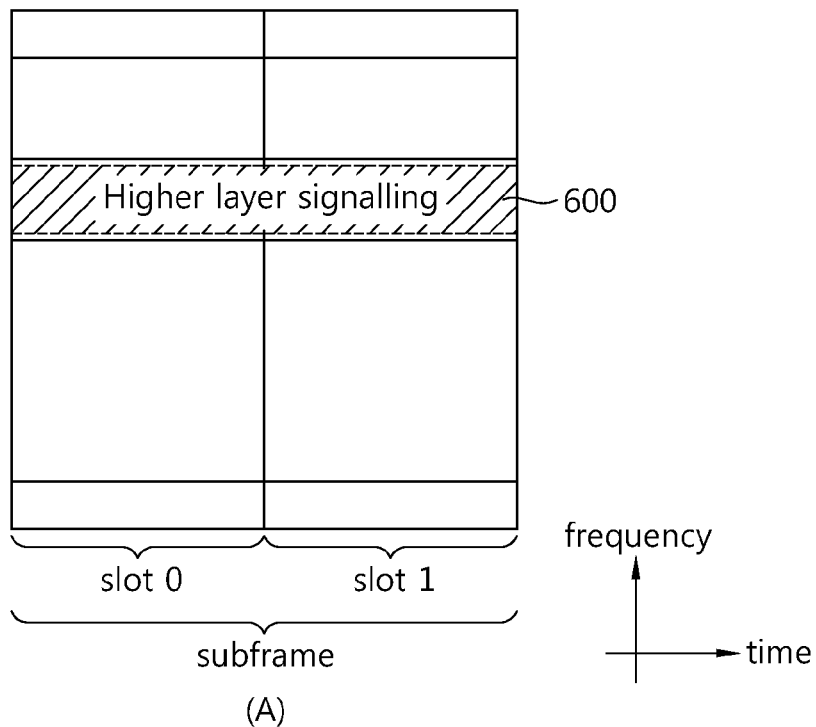
FIGS. 6 and 7 are concept views illustrating a method for assigning a terminal-specific PUSCH in a terminal-specific frequency band according to an embodiment of the present invention.
Figure 6:
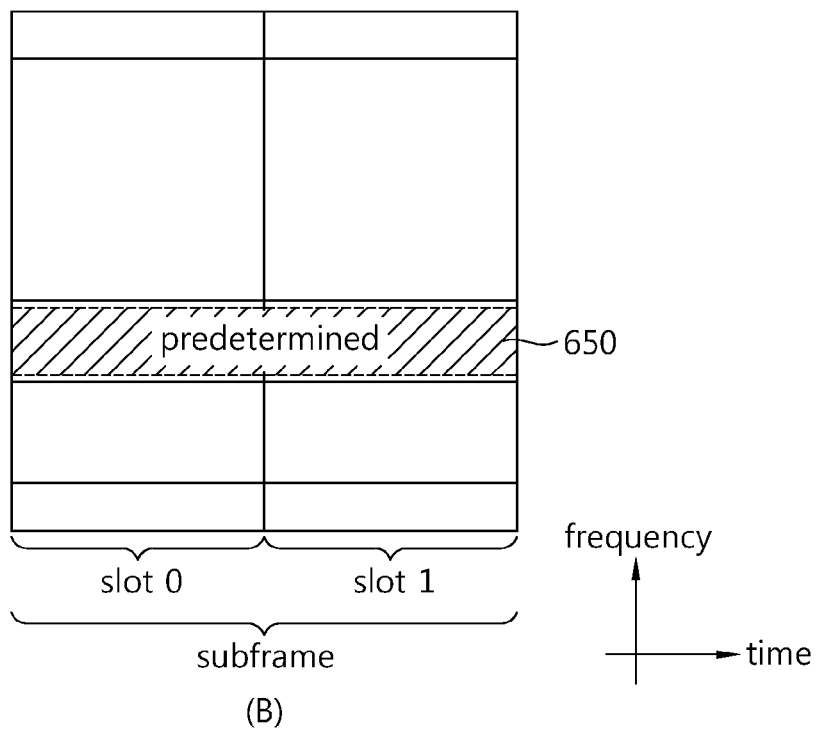
Figure 7:
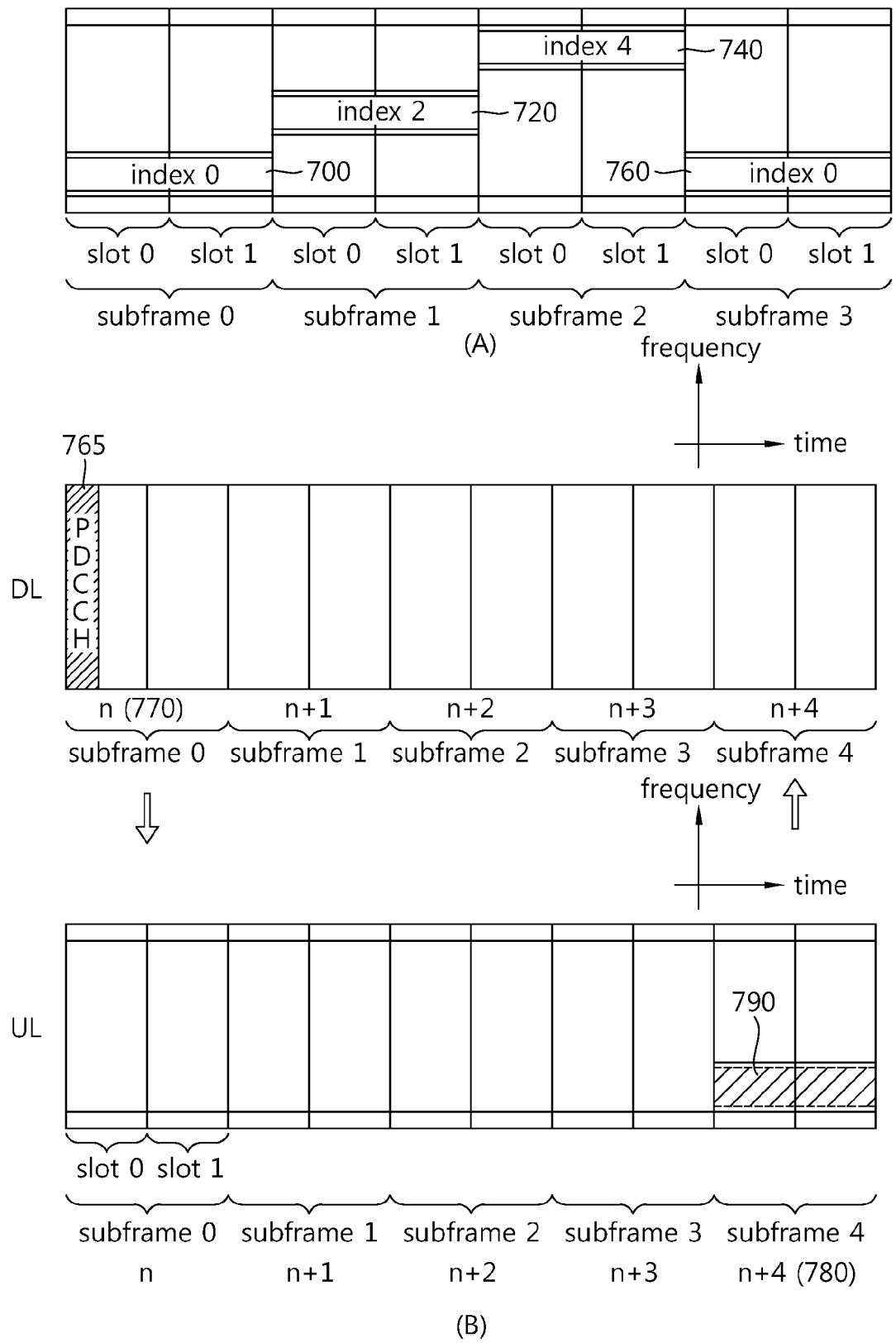

FIGS. 6 and 7 are concept views illustrating a method for assigning a terminal-specific PUSCH in a terminal-specific frequency band according to an embodiment of the present invention.

The base station may assign the terminal-specific PUSCH in various ways. Hereinafter, a method for assigning a terminal-specific PUSCH is described with reference to FIGS. 6(A) and (B) and FIGS. 7(A) and (B).

FIG. 6(A) illustrates a method for transmitting data through a terminal-specific PUSCH using resource allocation information transmitted from the base station.

Referring to FIG. 6(A), the base station may send information on a frequency band assigned to the terminal-specific PUSCH 600 using upper layer signaling (for example, RRC (radio resource control) signaling) or downlink control information (DCI). As described above, the overall uplink frequency band may include at least one terminal-specific frequency band, and the terminal-specific frequency band may include a terminal-specific PUSCH 600 and a terminal-specific PUCCH.

The control information transmitted at an upper layer such as RRC layer may contain information instructing a specific frequency band as the terminal-specific PUSCH 600. The terminal may receive information on the frequency band to which the terminal-specific PUSCH 600 is assigned, based on RRC signaling. The terminal may send the terminal-specific PUSCH information through the frequency band of the obtained terminal-specific PUSCH 600.

FIG. 6(B) illustrates a method for allocating an uplink sync PUSCH to a predetermined frequency band.

Referring to FIG. 6(B), the frequency band available as the terminal-specific PUSCH 650 in the entire uplink frequency band may be fixed as a predetermined one. In such case, even without receiving the information for allocating the terminal-specific PUSCH 650 from the base station, the terminal may use the predetermined frequency band as the terminal-specific PUSCH 650.

FIG. 7(A) illustrates a method for allocating a terminal-specific PUSCH according to a predetermined frequency hopping pattern.

Referring to FIG. 7(A), the frequency hopping pattern may be preset in which a frequency band assigned with a terminal-specific PUSCH is hopped. The terminal-specific PUSCH may be changed for its assigned frequency bandwidth in predetermined units, such as, e.g., per subframe, according to the preset frequency hopping pattern.

For example, the uplink frequency bandwidth may include N subbands that may be used as the terminal-specific frequency band. In such case, a plurality of terminal-specific frequency bands may be indexed and may be then used as frequency hopping information. For example, the frequency band assigned with N terminal-specific PUSCHs may be indexed from 0 to N−1. The indexing information may be used to indicate the frequency band assigned with a certain terminal-specific PUSCH.

Based on the indexes on the frequency band assigned with the terminal-specific PUSCH, the frequency hopping pattern may be set as, e.g., {0, 2, 4, 0, 2, 4, 0, 2, 4, 1}. In such case, the terminal-specific PUSCH may be assigned according to the sequential frequency hopping pattern in such a manner that for the first subframe the terminal-specific frequency band of index 0 is assigned to the terminal-specific PUSCH 700, for the second subframe, the terminal-specific frequency band of index 2 is assigned to the terminal-specific PUSCH 720, and for the third subframe the terminal-specific frequency band of index 4 is assigned to the terminal-specific PUSCH 740.

Different frequency hopping patterns from each other according to cells may be defined and used to assign the terminal-specific PUSCH (cell specific frequency hopping pattern), or different frequency hopping patterns from each other may be defined and used according to terminals (UE specific frequency hopping pattern). In other words, there may be provided a frequency hopping pattern in which different terminal-specific PUSCHs are assigned according to cells or terminals.

FIG. 7(B) illustrates a method for assigning a terminal-specific PUSCH using resource allocation information transmitted from a base station.

Referring to FIG. 7(B), the PDCCH (physical downlink control channel) data transmitted from the base station through a downlink channel may include uplink resource allocation information.

Further, the PDCCH data may contain frequency band allocation information regarding allocation of the terminal-specific PUSCH. The terminal-specific PUSCH data may be transmitted through the frequency band of the terminal-specific PUSCH assigned via the PDCCH data.

For example, the terminal may obtain information on the frequency band assigned with the terminal-specific PUSCH 790 in the n+4$^{th}$ subframe 740 through the PDCCH data 765 of the nth subframe 770 transmitted through the downlink channel.

More specifically, the subframe where the uplink resource allocation information has been transmitted from the base station through the downlink channel may be transmitted as the nth subframe 770. The frequency bandwidth allocation information of the terminal-specific PUSCH included in the control channel of the nth subframe 770 may be used in the n+4$^{th}$ subframe 780 of the uplink channel.

In case the terminal-specific frequency band assigned with a PUSCH varies, the terminal may change its operation frequency band to the varied frequency band to send the terminal-specific PUSCH data. As another PUCCH data transmission method, a terminal-specific frequency band may be determined for transmitting the PUCCH data irrespective of the terminal-specific frequency band assigned with the PUSCH. For example, the terminal may send the PUCCH data through a fixed terminal-specific frequency band.

Figure 8:
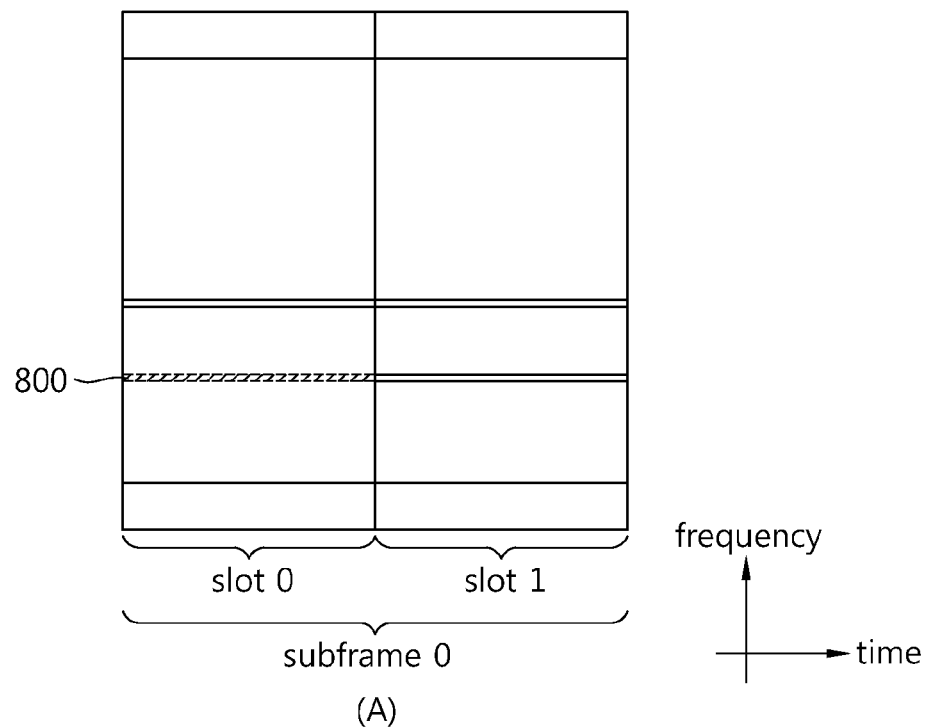
FIG. 8 is a concept view illustrating an RB (resource block) to which a terminal-specific PUCCH is assigned according to an embodiment of the present invention.
Figure 8:
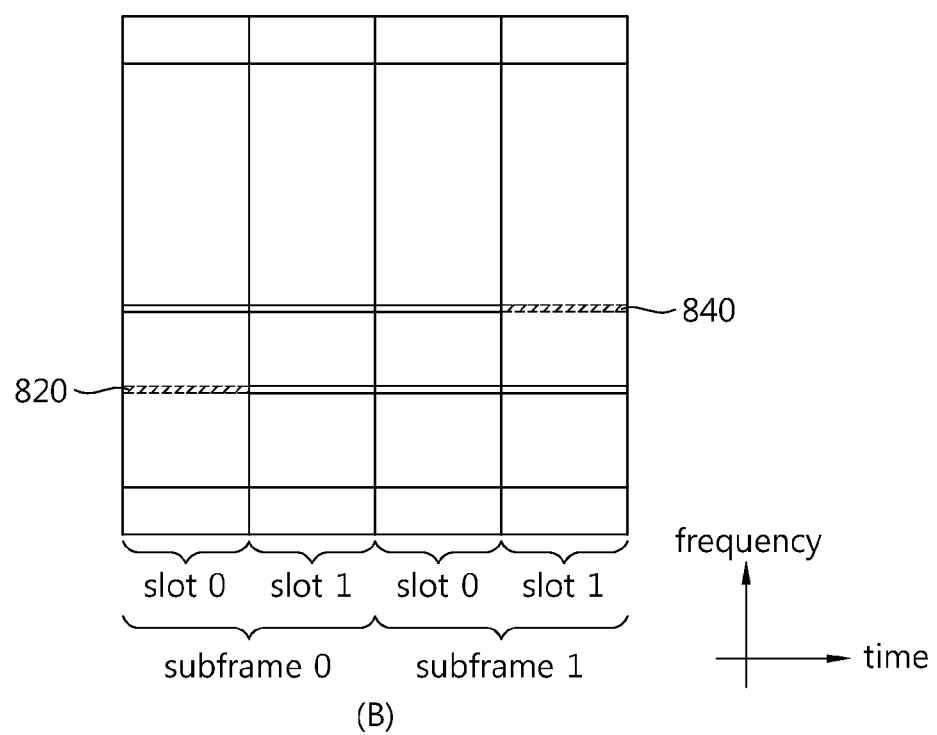

FIG. 8 is a concept view illustrating an RB (resource block) to which a terminal-specific PUCCH is assigned according to an embodiment of the present invention.

FIG. 8 illustrates a method for indexing and sending a resource assigned with a terminal-specific PUCCH in units of RB.

Referring to FIG. 8(A), the base station may inform the terminal of index information of the first RB among the resources of the terminal-specific PUCCH 800 assigned to the terminal. The terminal may send terminal-specific PUCCH data through the assigned terminal-specific PUCCH 800 based on the received index information.

Referring to FIG. 8(B), the base station may additionally send information on the indexes of the RBs starting to send an ACK/NACK and CSI among the resources of the terminal-specific PUCCHs 820 and 840. In other words, the base station may send specific resource allocation information on the specific information included in the terminal-specific PUCCH data as well as the index information of the RB assigned with the terminal-specific PUCCH.

Further, according to another embodiment of the present invention, information on the center frequency of the frequency band assigned as the terminal-specific PUCCH resource may be transmitted to the terminal to assign the resource of the terminal-specific PUCCH.

Hereinafter, a method for assigning the above-described terminal-specific PUSCH and terminal-specific PUCCH is described according to an embodiment of the present invention.

Figure 9:
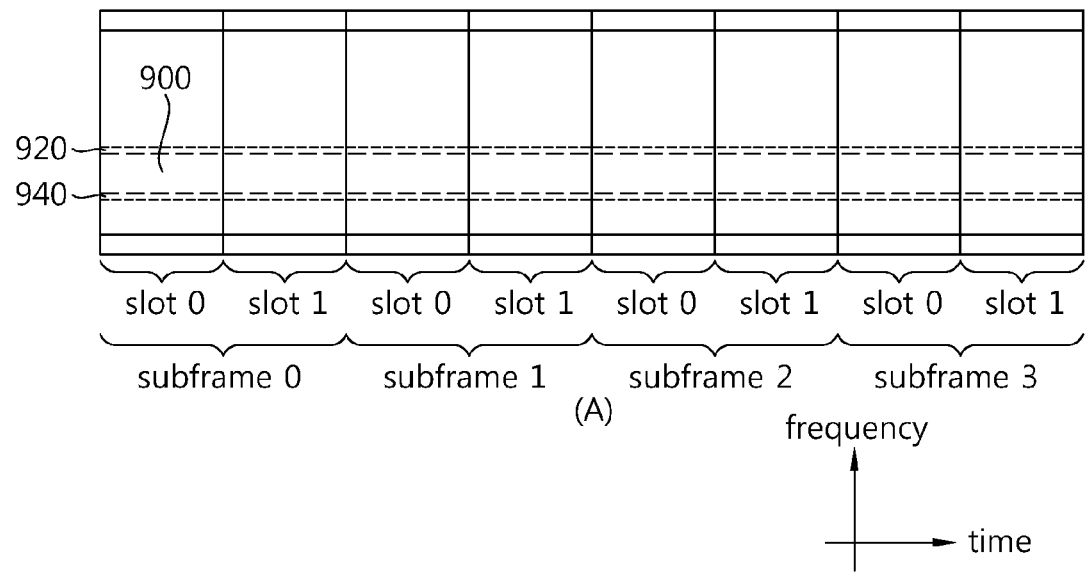
FIGS. 9 and 10 are concept views illustrating a method for assigning a terminal-specific PUSCH and a terminal-specific PUCCH according to an embodiment of the present invention.
Figure 9:
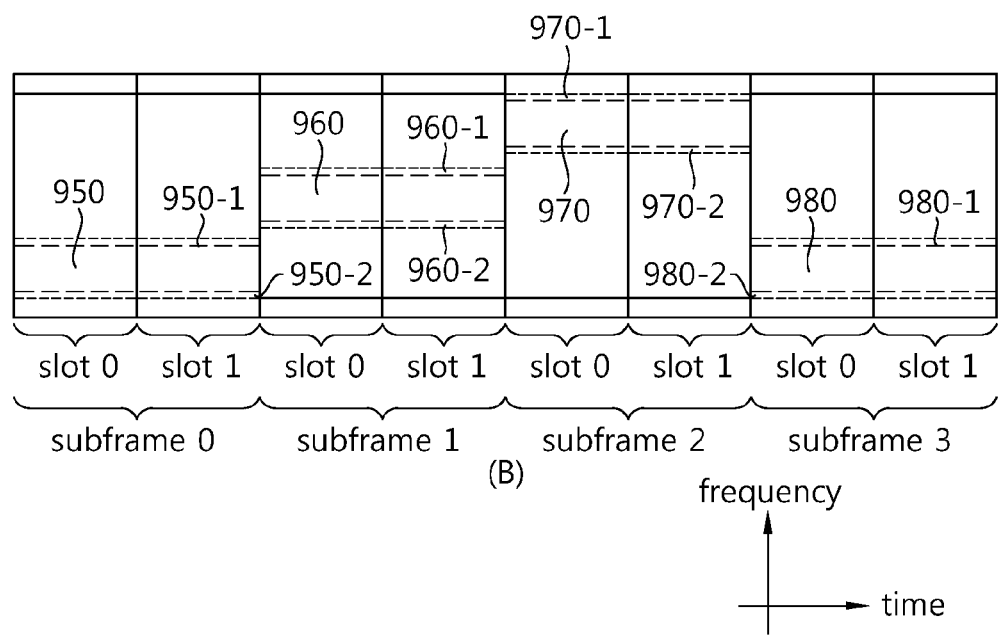
Figure 10:
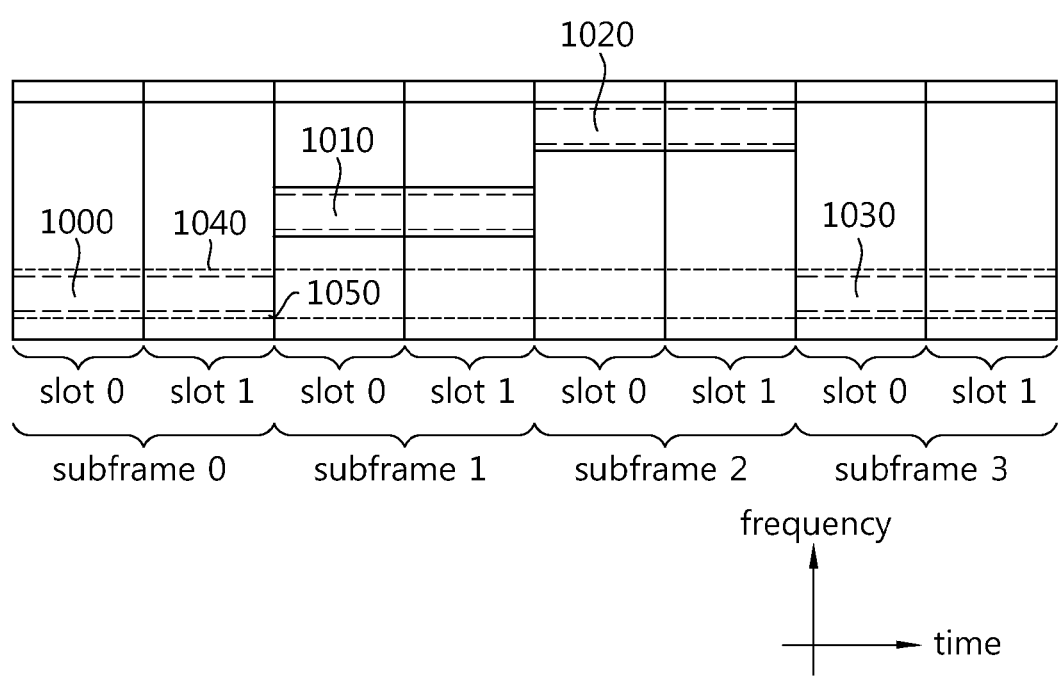

FIGS. 9 and 10 are concept views illustrating a method for assigning a terminal-specific PUSCH and a terminal-specific PUCCH according to an embodiment of the present invention.

FIGS. 9 and 10 illustrate a method for assigning the terminal-specific PUCCH and the terminal-specific PUSCH to the same or different terminal-specific frequency bands.

As described above, an uplink frequency band may include a plurality of terminal-specific frequency bands. One terminal-specific frequency band may include a terminal-specific PUSCH and a terminal-specific PUCCH.

In other words, the terminal may be assigned with the terminal-specific PUSCH data and the terminal-specific PUCCH data in the same terminal-specific frequency band.

Referring to FIG. 9(A), in case the terminal specifies a terminal-specific frequency band through upper layer signaling (RRC signaling) or DCI, the terminal may send the terminal-specific PUSCH information and the terminal-specific PUCCH information using the terminal-specific PUSCH 900 and the terminal-specific PUCCHs 920 and 940 of the specified terminal-specific frequency band.

In case the position of the resource assigned to the terminal-specific PUSCH 900 is statically or semi-statically configured, the terminal-specific PUCCHs 920 and 940 may be assigned in the same terminal-specific frequency band as the position of the terminal-specific PUSCH 900.

As another example, referring to FIG. 9(B), the frequency band assigned with the terminal-specific PUSCHs 950, 960, 970, and 980 may be frequency-hopped according to a predetermined pattern. In such case, the resources of the terminal-specific PUCCHs 950-1, 950-2, 960-1, 960-2, 970-1, 970-2, 980-1, and 980-2 included in the same terminal-specific frequency band as the frequency band of the frequency-hopped terminal-specific PUSCHs 950, 960, 970, and 980 may be assigned as PUCCH resources by the terminal.

As still another resource allocation method, the allocation information on the terminal-specific PUCCH resource may be independently determined.

The terminal-specific PUSCH resource may be dynamically assigned by upper layer signaling or DCI. In such case, the overhead of changing the position of the terminal-specific PUCCH resource according to the allocation information on the terminal-specific PUSCH needs to be reduced. Accordingly, the terminal-specific PUCCH and the terminal-specific PUSCH may be assigned to different terminal-specific frequency bands from each other.

FIG. 10 shows an example method for separately transmitting allocation information on terminal-specific PUCCHs.

For example, the terminal may determine allocation of terminal-specific PUSCHs based on the DCI received through a downlink channel. It may be assumed that the allocation information on the terminal-specific PUSCH changes from a first terminal-specific frequency band 1000 through a second terminal-specific frequency band 1020 and a third terminal-specific frequency band 1020 back to the first terminal-specific frequency band 1030, according to subframes.

The terminal-specific PUCCHs 1040 and 1050, without changing according to the terminal-specific frequency band assigned with the terminal-specific PUSCH, may be assigned separately by receiving the allocation information on the terminal-specific PUCCHs through upper layer signaling (e.g., RRC signaling) or DCI.

The terminal-specific PUCCHs 1040 and 1050 may be assigned in the first terminal-specific frequency band through RRC signaling and the terminal-specific PUCCH data may be sent in the assigned frequency band.

In other words, the resource allocation method according to an embodiment of the present invention may independently assign the terminal-specific PUCCHs 1000, 1010, 1020, and 1030 and the terminal-specific PUCCHs 1040 and 1050 independently from each other.

The terminal may send an SRS (sounding reference signal) as well as the terminal-specific PUSCH data and terminal-specific PUCCH data through the terminal-specific frequency band.

The SRS is a reference signal transmitted from the terminal so that the base station may estimate the channel state information on the terminal's uplink channel. The SRS may be used for the base station to assign resources of good channel quality to the terminal. Further, the SRS may be used for performing link adaptation and power control between the terminal and the base station. Upon transmission of the SRS, such transmission may be limited so that the SRS is transmitted only in the terminal-specific frequency band. The SRS transmitted only in the terminal-specific frequency band is defined and used as a terminal-specific SRS.

Figure 11:
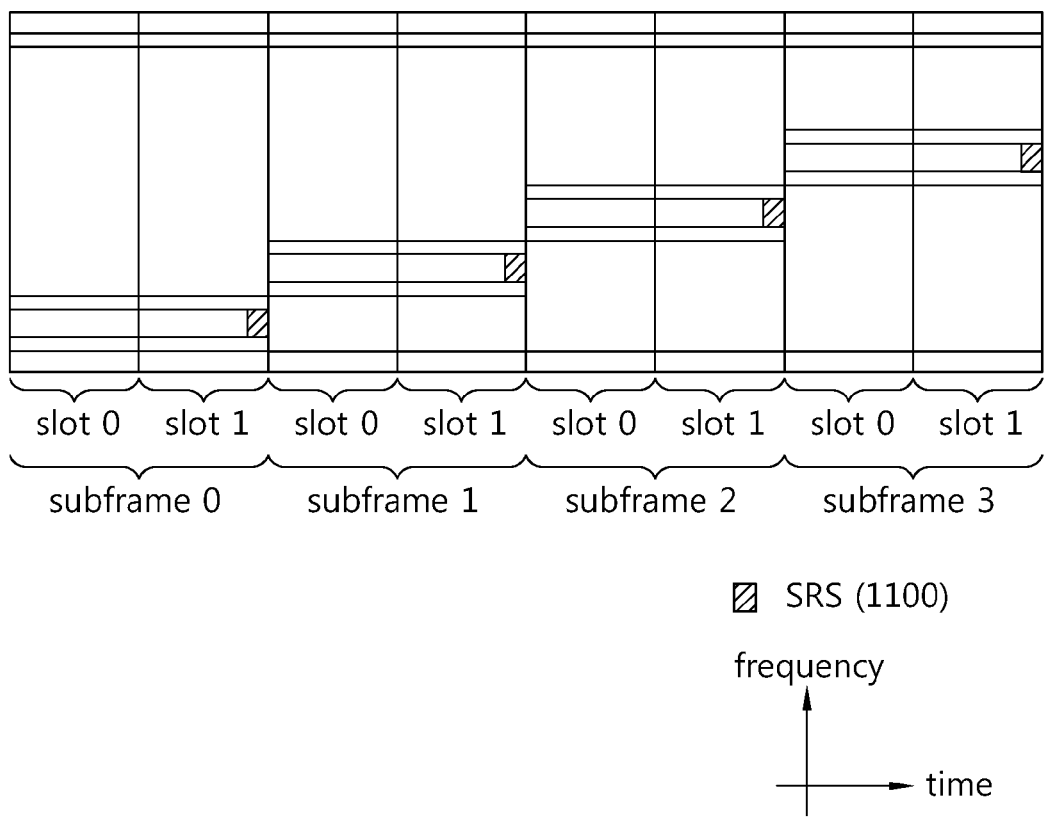
FIG. 11 is a concept view illustrating a method for transmitting a terminal-specific SRS according to an embodiment of the present invention.

FIG. 11 is a concept view illustrating a method for transmitting a terminal-specific SRS according to an embodiment of the present invention.

Referring to FIG. 11, after performing random access, the specific terminal may sequentially send the SRS 1100 on all the terminal-specific frequency bands. After the terminal has performed the random access, the terminal's SRS transmission may be limited to a terminal-specific band. The base station may assign a terminal-specific frequency band to be used by the terminal using the channel state information produced based on the SRS 1100.

In other words, the terminal may sequentially send the SRS 1100 on the terminal-specific frequency band indexed from 1 to N−1 used as the terminal-specific frequency band. The base station may predict the channel state information of the uplink channel based on the SRS 1100 received from the terminal. At least one of the plurality of terminal-specific frequency bands may be determined as the terminal's terminal-specific frequency band based on the channel state information of the uplink channel.

In sequentially sending the SRS 1100 in the terminal-specific frequency band, a portion of the terminal-specific frequency band, but not the entire terminal-specific frequency band, may be specified so that the SRS 1100 may be sent only in the specified portion. For example, the SRS 1100 may be included only in some RBs corresponding to the center frequency of the terminal-specific frequency band, and the SRS 1100 may be transmitted. The terminal may send the SRS only in the terminal-specific frequency band. If the terminal is configured to send the SRs in a band outside the terminal-specific frequency band, the terminal might not send the SRS. Further, also in case the terminal is configured to send the SRS in two terminal-specific frequency bands, the terminal might not send the SRS. As another method, in case the terminal is configured so that the SRS transmission is performed through a plurality of bands, the terminal may send the SRS only in the terminal-specific frequency band in which the terminal operates.

As another method for sending the SRS 1100, in case the transmission of the SRS 1100 is limited to the terminal-specific frequency band, the SRS 1100 might not be limited as transmitted in the last OFDM symbol of the subframe.

Figure 12:
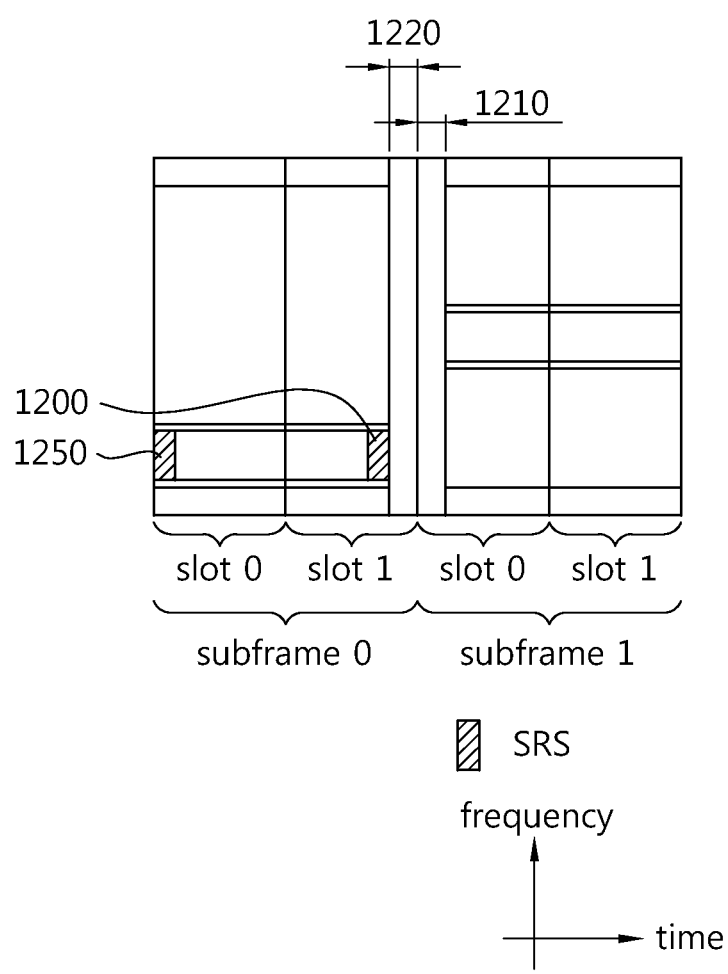
FIG. 12 shows an example where the position of the OFDM symbol where the SRS is transmitted in the terminal-specific frequency band is changed according to an embodiment of the present invention.

FIG. 12 shows an example where the position of the OFDM symbol where the SRS is transmitted in the terminal-specific frequency band is changed according to an embodiment of the present invention.

In case the terminal-specific frequency band assigned to the terminal changes, the terminal may perform frequency tuning for changing the terminal-specific frequency band. A delay may occur when the terminal performs the frequency tuning. For example, in case the terminal-specific frequency band assigned to the terminal changes, a delay may take place in the period 1210 corresponding to n (n is a natural number) OFDM symbols from the first OFDM symbol among the OFDM symbols on the time axis in the terminal-specific frequency band where the terminal shifted. As another example, the period 1220 corresponding to the last n OFDM symbols on the time axis in the terminal-specific frequency band before the terminal shifts may be a delayed period.

In case a frequency tuning delay occurs, if the SRS is transmitted in the last OFDM symbol, the SRS might not be sent to the base station. Accordingly, the position of the OFDM symbol where the SRS is transmitted may be newly set. For example, the SRS 1200 may be configured to be sent in the OFDM symbol used right before the OFDM symbol that is not used for the reason of frequency tuning or the SRS 1250 may be configured to be sent in the OFDM symbol other than the OFDM symbol that is not used for the reason of frequency tuning.

The following two types of upper layer signaling may be used to configure information on the OFDM symbol where the SRS is transmitted. For example, the upper layer signaling may enable transmission of (10 information on the OFDM symbol available by the terminal among the OFDM symbols of the subframe transmitted through the uplink channel (information on the first OFDM symbol and the last OFDM symbol) and (2) information on the OFDM symbol where the SRS is transmitted. (1) and (2) are now described in detail.

(1) Information on the OFDM Symbol of the UL Subframe Used by the Terminal for Transmission of Information In case the terminal-specific frequency band used by the terminal changes, a delay for frequency tuning may occur in a predetermined transient period where the terminal-specific frequency band changes. Considering such frequency tuning delay, information on the OFDM symbol of the subframe used by the terminal for actual transmission of information may be transmitted to the terminal through upper layer signaling. The terminal may be aware of the information on the OFDM symbol used for actual transmission of data in the terminal-specific frequency band through the upper layer signaling.

Use of such method may avoid damage to the subsequent terminal's transmission, which may occur when the terminal fails to satisfy the requirement on the transient period that occurs upon transmission on/off between the subframes. Further, a half-duplex terminal may be avoided from the need to configure a gap for a delay used for switching from downlink (DL) to uplink (UL).

(2) Information on the Symbol Index where SRS is Transmitted

Information indicating a specific OFDM symbol where the SRS is transmitted may also be transmitted through upper layer signaling. Unless there is a limitation that the SRS should be transmitted in the last OFDM symbol of the subframe, the SRS may be transmitted in a specific OFDM symbol among the OFDM symbols of the subframe, and information on the OFDM symbol where the SRS is transmitted may be transmitted by upper layer signaling. As described above in connection with (2)(D), allocation for the terminal-specific PUSCH may be determined by upper layer signaling, and in such case, the base station may obtain the channel state information through the SRS transmitted from the terminal in order to determine the terminal-specific frequency band assigned with the terminal-specific PUSCH.

In case the terminal-specific frequency band changes in one subframe or between contiguous subframes when performing uplink transmission, various methods may be used to conduct uplink transmission on PUSCH data, PUCCH data, and SRS. Hereinafter, a method for transmitting PUSCH data, PUCCH data, and SRS through one subframe or a plurality of subframes by the terminal is described below, according to an embodiment of the present invention.

Figure 13:
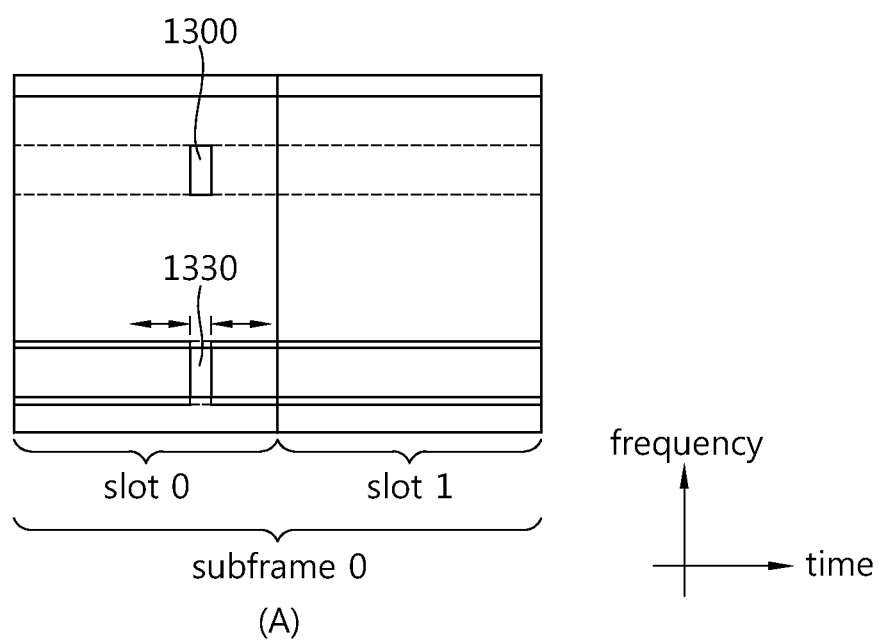
FIGS. 13 and 14 are concept views illustrating a method for sending a PUSCH and an SRS in one subframe according to an embodiment of the present invention.
Figure 13:
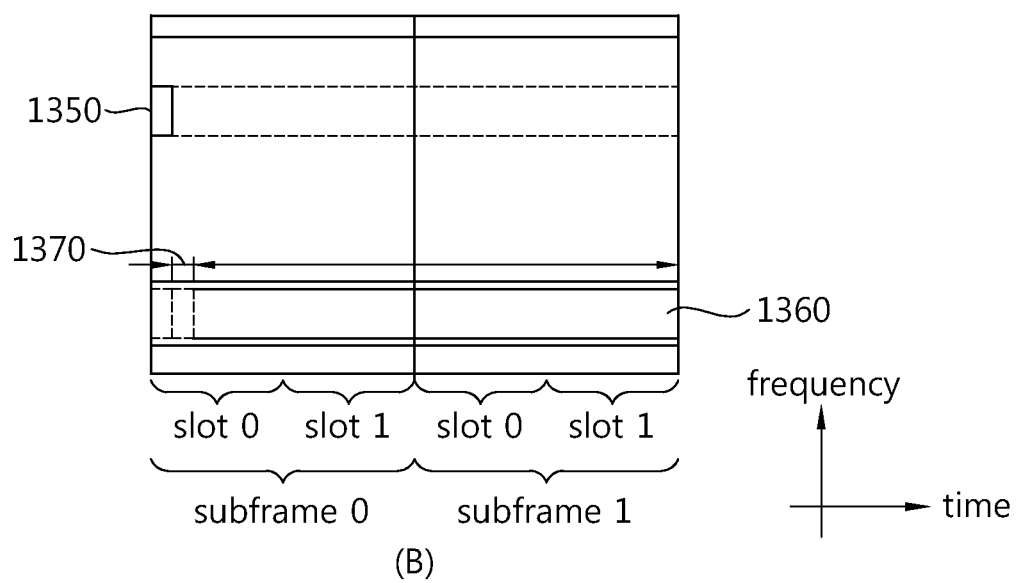
Figure 14:
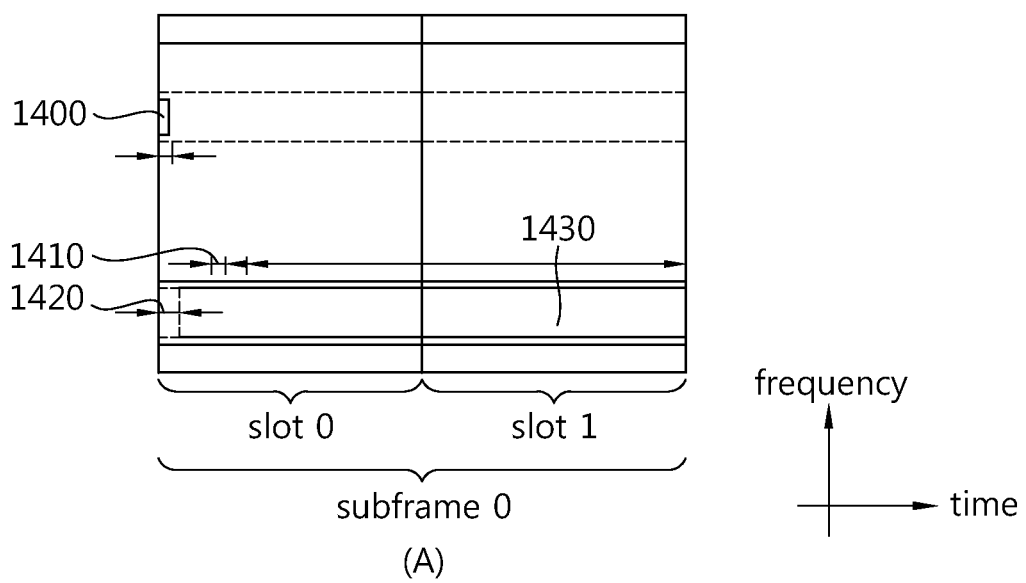
Figure 14:
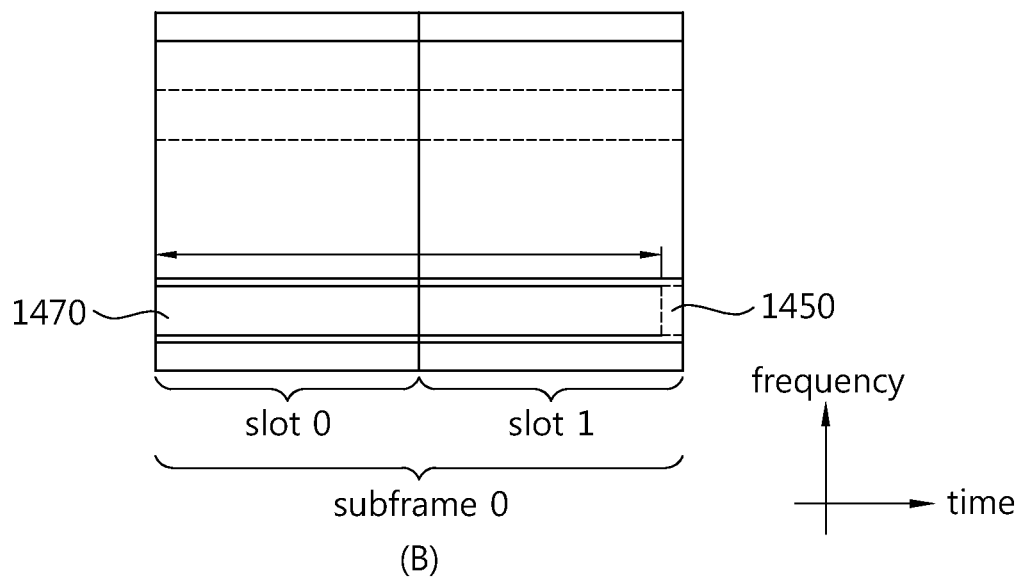

FIGS. 13 and 14 are concept views illustrating a method for sending a PUSCH and an SRS in one subframe according to an embodiment of the present invention. FIG. 13(A) illustrates an example where the terminal-specific frequency band used for the terminal to send an SRS is set to be different from the terminal-specific frequency band assigned with the terminal-specific PUSCH.

The terminal needs to change the existing terminal-specific frequency band assigned with the terminal-specific PUSCH in order to send the SRS 1300 in the specific OFDM symbol. TO change the operation frequency band, the terminal needs frequency tuning, resultantly causing waste of resources. To address such problem, the terminal, when needing transmission tuning to send the SRS 1300, does not change the terminal-specific frequency band to send the SRS nor does the terminal send the SRS 1300 in the corresponding symbol. The terminal may assign the symbol 1330 assigned to send the SRS 1300 to the terminal-specific PUSCH using the existing terminal-specific frequency band.

FIG. 13(B) illustrates an example where the terminal-specific frequency band used for the terminal to send the SRS 1350 is set to be different from the terminal-specific frequency band assigned with the terminal-specific PUSCH.

FIG. 13(B) illustrates a method for transmitting the SRS 1350 through the first terminal-specific frequency band and the PUSCH information 1360 through the second terminal-specific frequency band. In such case, the terminal-specific frequency bands used for the terminal to send the terminal-specific PUSCH information 1360 and the SRS 1350 in one subframe are different from each other. In case the terminal-specific frequency band varies, the time period 1370 corresponding to a predetermined OFDM symbol may be set as a period for frequency tuning. The terminal-specific PUSCH may be assigned for the remaining OFDM symbols other than the period 1370 caused by the frequency tuning delay, and the terminal-specific PUSCH data 1360 may be transmitted with rate matching performed considering the frequency tuning delay.

The delay period for frequency tuning may be smaller than one OFDM symbol.

FIG. 14(A) illustrates an example in which the delay period 1410 for frequency tuning is smaller than one OFDM symbol 1420. In such case, the delay period 1410 may be considered for frequency tuning in the OFDM symbol period 1420 during which the SRS 1400 is transmitted, and the terminal-specific PUSCH data 1430 may be transmitted through the remaining subframe OFDM symbols.

FIG. 14(B) illustrates an example in which the terminal-specific frequency band where the SRS 1450 is transmitted and the terminal-specific frequency band assigned with the terminal-specific PUSCH 1470 have an inclusion relation. In other words, the terminal-specific frequency band where the SRS is transmitted may be included in the terminal-specific frequency band for PUSCH or vice versa. In general, the size of the band assigned for the terminal-specific PUSCH may be larger than the size of the band for SRS transmission.

Since the terminal-specific frequency band where the SRS 1450 is the same as the terminal-specific frequency band assigned with the terminal-specific PUSCH 1470, no frequency tuning is required. The data transmitted through the terminal-specific PUSCH 1470 may be transmitted data-matched, considering the OFDM symbol period during which the SRS 1450 is transmitted.

Considering that the terminal-specific PUCCH is assigned and the SRS is transmitted in one subframe, the resource assigned for transmission of the terminal-specific PUCCH differs from the resource assigned for SRS transmission. Accordingly, the terminal-specific PUCCH and the SRS are not assigned to the same OFDM symbol. In such case, the SRS is not transmitted.

Figure 15:
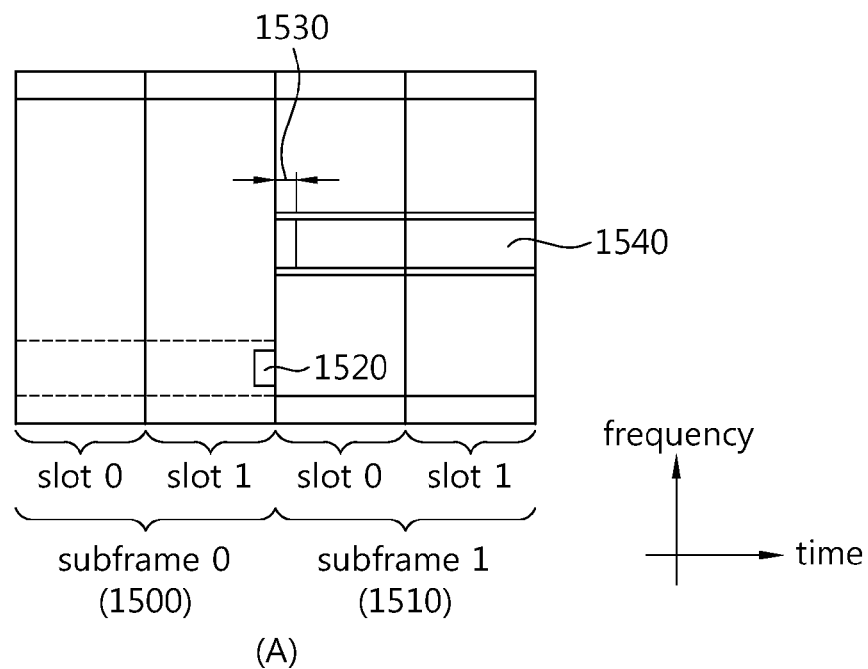
FIGS. 15 and 16 are concept views illustrating a method for assigning an SRS and a terminal-specific PUSCH in a plurality of subframes according to an embodiment of the present invention.
Figure 15:
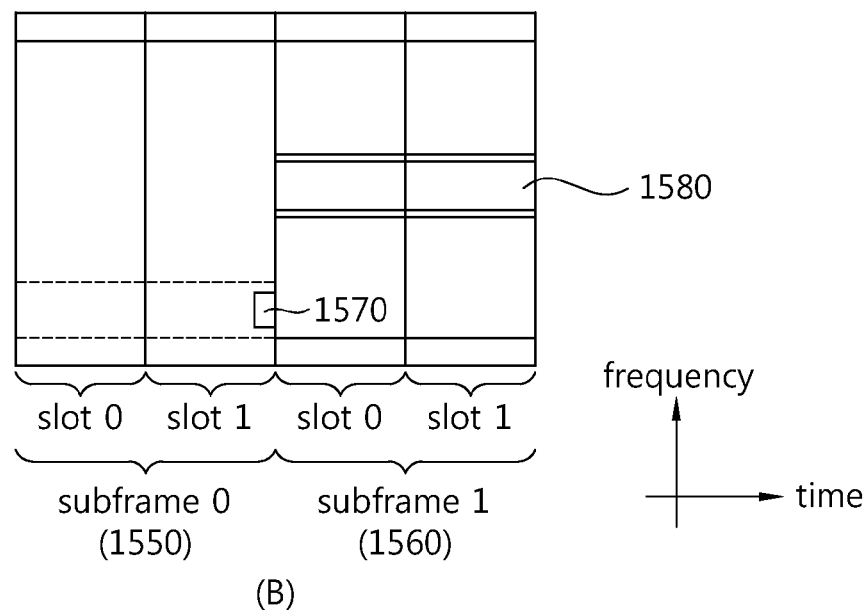
Figure 16:
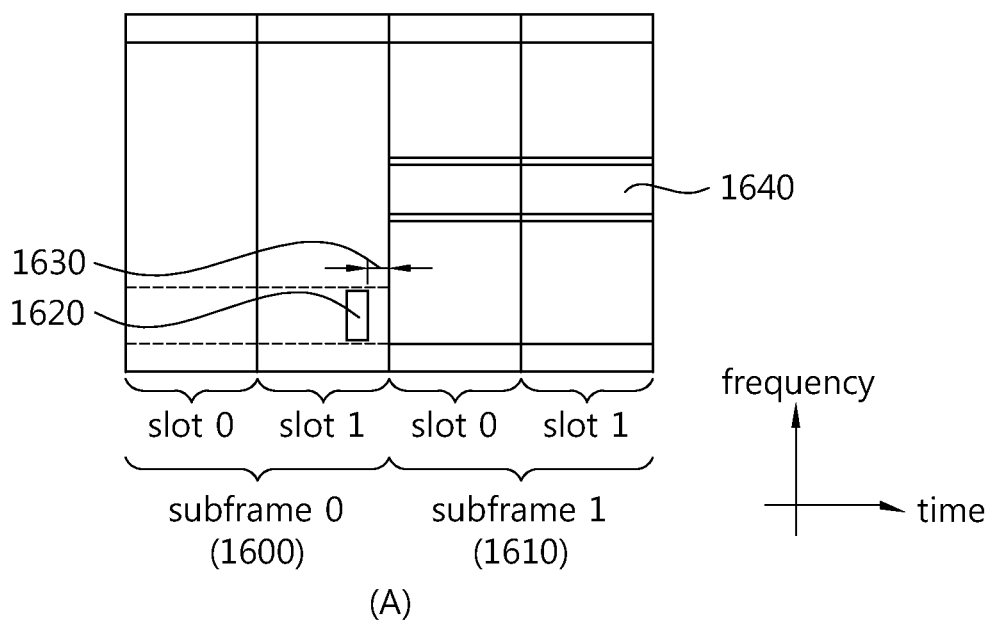
Figure 16:
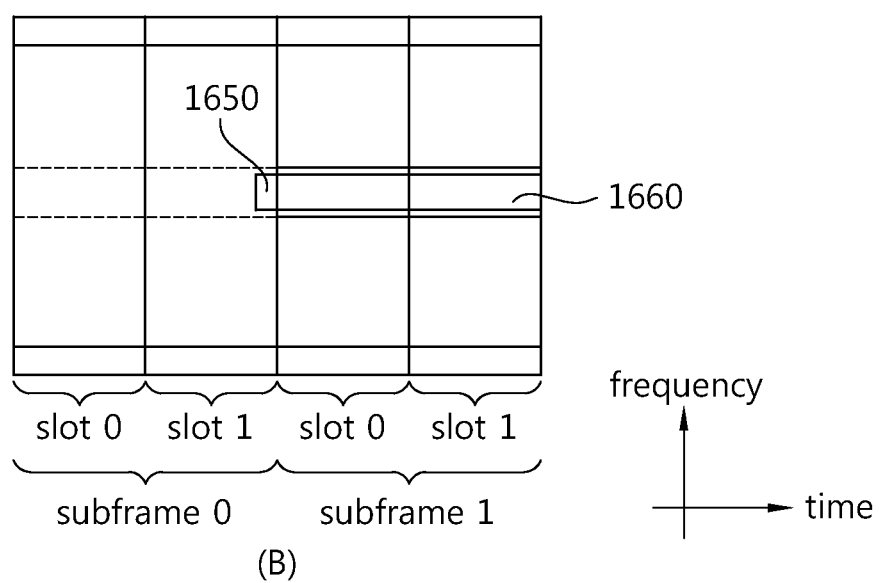

FIGS. 15 and 16 are concept views illustrating a method for assigning an SRS and a terminal-specific PUSCH in a plurality of subframes according to an embodiment of the present invention.

FIG. 15(A) illustrates an example in which the terminal-specific frequency bandwidth in which the SRS 1520 and the terminal-specific PUSCH data 1540 are transmitted in the first subframe 1500 and the second subframe 1510 varies.

The SRS 1520 may be transmitted in the last OFDM symbol of the first subframe 1500 through the first terminal-specific frequency band, and the terminal-specific PUSCH data 1540 of the second subframe 1510 may be transmitted through the second terminal-specific frequency band. In such case, the terminal-specific PUSCH data 1540 might not be transmitted during a predetermined symbol period 1530 corresponding to the frequency tuning delay period among the OFDM symbols of the second subframe 1510. Accordingly, the terminal-specific PUSCH data 1540 may be transmitted which has undergone rate matching considering such frequency tuning delay period.

FIG. 15(B) illustrates an example in which the terminal-specific frequency bandwidth in which the SRS 1570 and the terminal-specific PUSCH data 1580 are transmitted between the first subframe 1550 and the second subframe 1560 varies.

In case frequency tuning for transmitting the terminal-specific PUSCH data 1580 is performed in the next subframe after the SRS 1570 has been sent, the SRS 1570 might not be transmitted in the previous subframe to prevent a frequency tuning delay from occurring.

FIG. 16(A) illustrates an example in which the terminal-specific frequency bandwidth in which the SRS 1620 and the terminal-specific PUSCH data 1640 are transmitted between the first subframe 1600 and the second subframe 1610 varies.

In FIG. 16(A), a portion of the last OFDM symbol period during which the SRS 1620 is transmitted in the first subframe 1600 may be used as the frequency tuning delay period.

For example, in case the frequency tuning delay period is smaller than one OFDM symbol, the last OFDM symbol may be used as period for transmitting the SRS 1620 during only a predetermined period, and the remaining period 1630 may be used as frequency tuning delay period that occurs as the terminal changes its operation frequency band. The second subframe 1610, without using a separate frequency tuning delay period, may use the first OFDM symbol and its subsequent ones as resources for transmitting the terminal-specific PUSCH data 1660.

FIG. 16(B) illustrates an example in which the terminal-specific frequency band used for transmitting the SRS 1650 and the terminal-specific PUSCH data 1660 in a plurality of subframes does not vary. Since in such case no frequency tuning delay period occurs, the SRS 1650 and the terminal-specific PUSCH data 1660 may be transmitted in the same terminal-specific frequency band.

Figure 17:
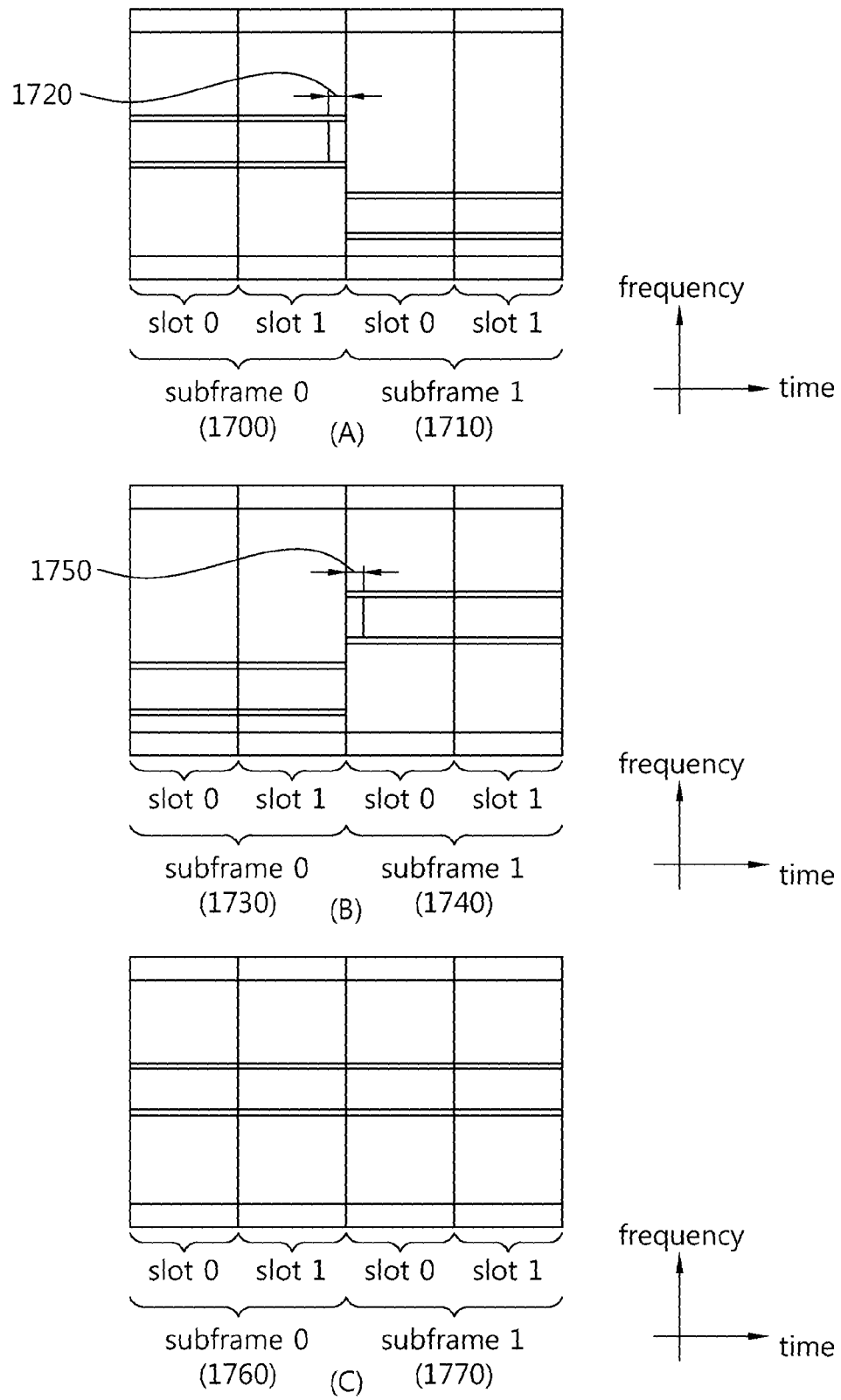
FIG. 17 is a concept view illustrating a method for contiguously allocating terminal-specific PUSCHs in a plurality of subframes according to an embodiment of the present invention.

FIG. 17 is a concept view illustrating a method for contiguously allocating terminal-specific PUSCHs in a plurality of subframes according to an embodiment of the present invention.

FIG. 17 illustrates a method for allocating the terminal-specific PUSCH through the first subframe in the first terminal-specific frequency band and allocating the terminal-specific PUSCH through the second subframe in the second terminal-specific frequency band. In case the terminal-specific frequency band varies between subframes, one of a symbol period including the last OFDM symbol of the first subframe corresponding to the previous subframe or a symbol period including the first OFDM symbol of the second subframe may be set as a frequency tuning delay period.

FIG. 17(A) is a concept view illustrating a method for configuring a frequency tuning delay in some symbol period including the last OFDM symbol of the first subframe.

The symbol period 1720 including the last OFDM symbol of the first subframe 1700 may be a period 1720 for reflecting a frequency tuning delay created in varying the operation frequency from the first terminal-specific frequency to the second terminal-specific frequency. In such case, the symbol period for transmission of the terminal-specific PUSCH data transmitted in the first subframe 1700 may be reduced, and rate matching may be conducted to reflect the same.

FIG. 17(B) is a concept view illustrating a method for configuring a frequency tuning delay in some symbol period 1750 including the first OFDM symbol of the second subframe 1740.

The symbol period 1750 including the first OFDM symbol of the second subframe 1740 may be a period 1750 for reflecting the frequency tuning delay created in varying the operation frequency from the first terminal-specific frequency to the second terminal-specific frequency. In such case, the symbol period for transmission of the terminal-specific PUSCH data transmitted in the second subframe 1740 may be reduced, and rate matching may be conducted to reflect the same.

FIG. 17(C) is a concept view illustrating an example in which the same terminal-specific frequency band is used for allocating terminal-specific PUSCHs between a plurality of subframes.

In case the same terminal-specific frequency bandwidth is used to allocate terminal-specific PUSCHs between the first subframe 1760 and the second subframe 1770, no frequency tuning delay is required. Accordingly, the first subframe 1760 and the second subframe 1770 may be transmitted through the same terminal-specific frequency band. In case the terminal-specific PUSCH data is contiguously scheduled, it may be transmitted in the same terminal-specific frequency band so that no terminal-specific frequency tuning delay occurs.

Figure 18:
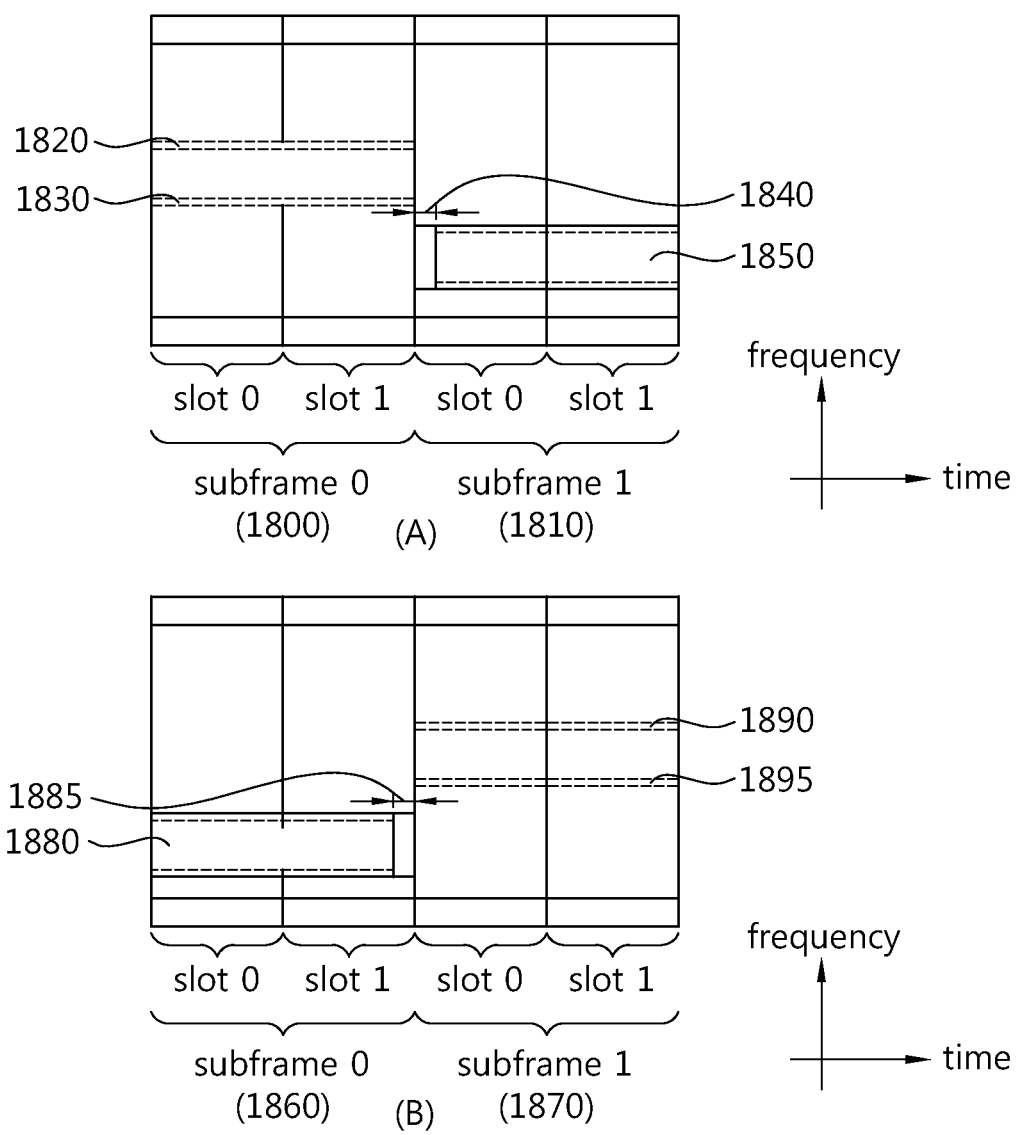
FIG. 18 is a concept view illustrating a method for contiguously allocating terminal-specific PUCCHs and terminal-specific PUSCHs according to an embodiment of the present invention.

FIG. 18 is a concept view illustrating a method for contiguously allocating terminal-specific PUCCHs and terminal-specific PUSCHs according to an embodiment of the present invention.

FIG. 18 illustrates a method for allocating a terminal-specific PUCCH and a terminal-specific PUSCH in the first subframe and the second subframe.

Referring to FIG. 18(A), the terminal-specific PUCCHs 1820 and 1830 may be assigned in the first subframe 1800 using the first terminal-specific frequency, and the terminal-specific PUSCH 1850 may be assigned in the second subframe 1810 using the second terminal-specific frequency.

After the terminal-specific PUCCH data has been transmitted through the first terminal-specific frequency in the first subframe 1800, some period including the first OFDM symbol in the second subframe 1810 may be used as a frequency tuning delay period. Accordingly, the remaining symbols except the frequency tuning delay period 1840 in the second subframe 1810 may be used as symbols for transmitting the terminal-specific PUSCH data.

Referring to FIG. 18(B), the terminal-specific PUSCH data 1880 may be transmitted in the first subframe 1860 using the first terminal-specific frequency, and the terminal-specific PUCCH data 1890 and 1895 may be transmitted in the second subframe 1870 using the second terminal-specific frequency.

In case after the terminal-specific PUSCH data 1880 has been transmitted through the first terminal-specific frequency band in the first subframe 1860, the terminal-specific PUCCH data 1890 and 1895 are transmitted in the second subframe 1870 through the second terminal-specific frequency band, some period including the last OFDM symbol in the first subframe 1860 may be set and used as a frequency tuning delay period 1885. In such case, the remaining OFDM period except the frequency tuning delay period in the first subframe 1860 may be used for transmitting the terminal-specific PUSCH data 1880.

In other words, in case the terminal-specific PUSCH and the terminal-specific PUCCH are contiguously assigned in the same terminal-specific frequency bandwidth, some OFDM symbol period of the subframe assigned with the terminal-specific PUSCH may be set and used as a frequency tuning delay period in order to transmit the terminal-specific PUCCH data without loss. The terminal-specific PUSCH data may be transmitted in the OFDM symbol period except the frequency tuning period in the subframe assigned with the terminal-specific PUSCH, and in such case, the terminal-specific PUSCH data may be transmitted with rate matching conducted to transmit the terminal-specific PUSCH data.

Figure 19:
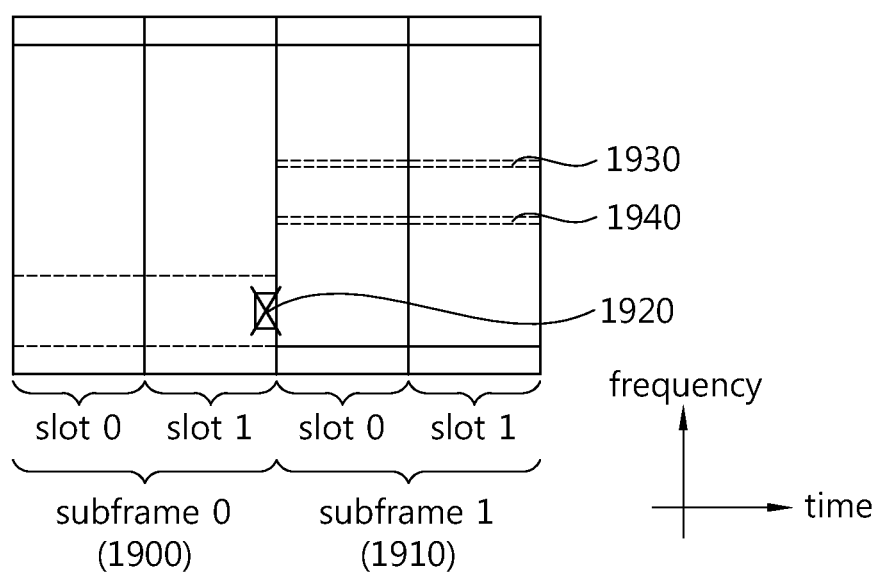
FIG. 19 is a concept view illustrating a method for allocating an SRS and a terminal-specific PUCCH according to an embodiment of the present invention.

FIG. 19 is a concept view illustrating a method for allocating an SRS and a terminal-specific PUCCH according to an embodiment of the present invention.

Referring to FIG. 19, in case the SRS 1920 is transmitted in the last symbol of the first subframe 1900 and the terminal-specific PUCCHs 1930 and 1940 are assigned in the second subframe 1910, the SRS 1920 might not be sent in the last symbol of the first subframe 1900. The period during which the SRS 1920 is transmitted may be assigned as a frequency tuning delay period and frequency tuning may be conducted.

Figure 20:
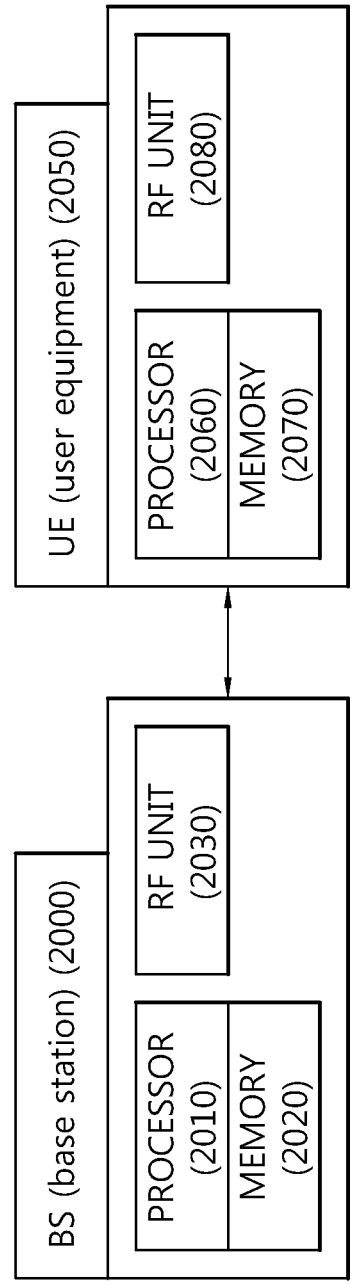
FIG. 20 is a block diagram illustrating a wireless communication system according to an embodiment of the present invention.

FIG. 20 is a block diagram illustrating a wireless communication system according to an embodiment of the present invention.

Referring to FIG. 20, the base station 2000 includes a processor 2010, a memory 2020, and an RF (Radio Frequency) unit 2030. The memory 2020 is connected with the processor 2010 and stores various types of information for driving the processor 2010. The RF unit 2030 is connected with the processor 2010 and transmits and/or receives radio signals. The processor 2010 implements functions, procedures, and/or methods as proposed herein. In the above-described embodiments, the operation of the base station may be implemented by the processor 2010.

For example, the processor 2010 may be implemented to send to the terminal information on a terminal-specific frequency band used for the terminal to send uplink channel data.

The wireless device 2050 includes a processor 2060, a memory 2070, and an RF unit 2080. The memory 2070 is connected with the processor 2060 and stores various types of information to drive the processor 2060. The RF unit 2080 is connected with the processor 2060 and transmits and/or receives radio signals. The processor 2060 implements functions, processes, and/or methods as proposed herein. In the above-described embodiments, the operation of the wireless device may be implemented by the processor 2060.

For example, the processor 2060 may be implemented to send to the base station uplink channel data based on the uplink channel allocation information transmitted from the base station.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

Although in the above-described exemplary embodiments, methods are described based on flowcharts having a series of steps or blocks, the present invention is not limited to the order of the steps, and some steps may be conducted in a different order from other steps or simultaneously with the other steps. Further, it may be understood by one of ordinary skill in the art that the steps in the flowcharts do not exclude each other, and rather, other steps may be added thereto or some thereof may be removed therefrom without affecting the scope of the present invention.

What is claimed is:

1. A method for An uplink transmission of an MTC (Machine Type Communication) terminal, the method comprising:
    transmitting first UL (uplink) information on a first UL channel in a first terminal-specific frequency band of a first OFDM (Orthogonal Frequency Division Multiplexing) symbol; and
    transmitting second UL information on a second UL channel in a second terminal-specific frequency band of a second OFDM symbol,
    wherein at least one OFDM symbol is arranged between the first OFDM symbol and the second OFDM symbol, and
    wherein when the first terminal-specific frequency band is not consistent with the second terminal-specific frequency band or when the first terminal-specific frequency band does not include the second terminal-specific frequency band, UL transmission is not performed in the at least one OFDM symbol between the first OFDM symbol and the second OFDM symbol.

2. The method of claim 1,
    wherein the first OFDM symbol is a last OFDM symbol of a first subframe, and the second OFDM symbol is a second OFDM symbol of a second subframe contiguous to the first subframe,
    wherein a bandwidth supported by the MTC terminal is smaller than an overall bandwidth of the first subframe and the second subframe,
    wherein the size of the first terminal-specific frequency band and the second terminal-specific frequency band is equal to or smaller than the bandwidth supported by the MTC terminal, and
    wherein the overall bandwidth is 20 MHz or more, and the bandwidth supported by the MTC terminal is 0.5 MH or more and 2 MHz or less.

3. The method of claim 1,
    wherein the first OFDM symbol is a last OFDM symbol of a first subframe, and the second OFDM symbol is a second OFDM symbol of a second subframe contiguous to the first subframe, and
    the method further comprising transmitting an SRS (Sounding Reference Signal) in a third terminal-specific frequency band of one OFDM symbol among a plurality of OFDM symbols in the first subframe.

4. The method of claim 3,
    wherein the UL transmission is not performed in an OFDM symbol subsequent to the OFDM symbol where the SRS is transmitted.

5. The method of claim 1,
    wherein the first UL channel includes at least one of a first PUCCH (physical uplink control channel) and a first PUSCH (physical uplink shared channel), and
    wherein the second UL channel includes at least one of a second PUCCH and a second PUSCH.

6. The method of claim 1, further comprising:
    receiving terminal-specific frequency band determination information from a base station, wherein the terminal-specific frequency band determination information includes information on the first terminal-specific frequency band and the second terminal-specific frequency band.

7. The method of claim 6,
wherein the terminal-specific frequency band determination information includes information on a frequency pattern in which a frequency band changes from the first terminal-specific frequency band to the second terminal-specific frequency band.

* * * * *